(12) United States Patent
Özden et al.

(10) Patent No.: US 12,270,245 B2
(45) Date of Patent: *Apr. 8, 2025

(54) FRAME ASSEMBLY COMPRISING A VACUUM INSULATED GLASS UNIT FIXED TO A FRAME BY MEANS OF A STRUCTURAL ADHESIVE

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 706 days.

This patent is subject to a terminal disclaimer.

(21) Appl. No.: 17/422,813

(22) PCT Filed: Jan. 13, 2020

(86) PCT No.: PCT/DK2020/050014
§ 371 (c)(1),
(2) Date: Jul. 14, 2021

(87) PCT Pub. No.: WO2020/147905
PCT Pub. Date: Jul. 23, 2020

(65) Prior Publication Data
US 2022/0127899 A1    Apr. 28, 2022

(30) Foreign Application Priority Data

Jan. 14, 2019  (DK) ............................. PA201970020
Jan. 14, 2019  (DK) ............................. PA201970021
(Continued)

(51) Int. Cl.
*E06B 3/56*   (2006.01)
*E04D 13/03*  (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ........ E06B 3/54; E06B 3/5409; E06B 3/5454; E06B 3/5481; E06B 3/62; E06B 3/6608; E06B 3/6612; E06B 3/677
See application file for complete search history.

(56) References Cited

U.S. PATENT DOCUMENTS 2,595,927 A      5/1952  Chapin
2,617,159 A  *  11/1952  Leighton ............... E06B 3/5409
                                                     52/204.593
(Continued)

FOREIGN PATENT DOCUMENTS

CN    2835403 Y    11/2006
CN    106760122 A   5/2017
(Continued)

OTHER PUBLICATIONS

International Search Report for corresponding application PCT/DK2020/050008 filed Jan. 13, 2020; Mail date Apr. 3, 2020.
(Continued)

*Primary Examiner* — Ryan D Kwiecinski
(74) *Attorney, Agent, or Firm* — CANTOR COLBURN LLP

(57) ABSTRACT

The present disclosure relates to a vacuum insulated glass (VIG) unit frame assembly (10), wherein said vacuum insulated glass unit frame assembly (10) comprises: a rectangular vacuum insulated glass unit (1) comprising two glass sheets (2a, 2b) separated by a gap (11) between said glass sheets (2a, 2b), wherein a plurality of support structures (12) are distributed in said gap (11) and wherein said
(Continued)

Figure 1:
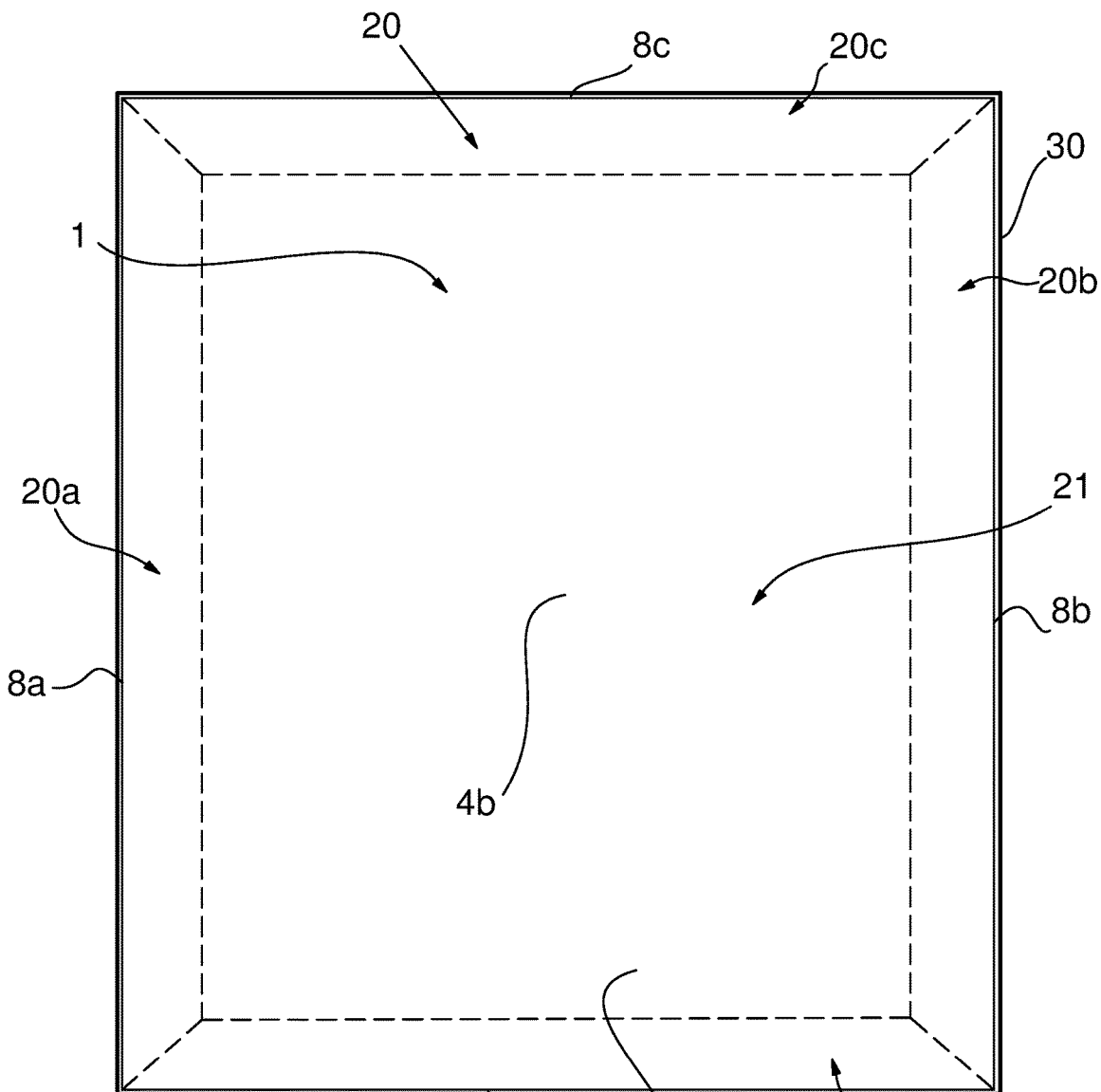

gap (11) is sealed, and a frame (20) comprising elongated frame profile arrangements (20a-20d, 70) arranged to provide a frame opening (21) extending in a frame opening plane (P2) defined between the elongated frame profile arrangements (20a-20d, 70). A plurality of edges (8a-8d) of said rectangular vacuum insulated glass unit (1) overlaps an elongated frame profile arrangement (20a-20d, 70) of said frame (20), and an inwardly directed, major surface (4a, 4b, 15, 35a) of a glass sheet (2a, 35a,) of the vacuum insulated glass unit (1) is bonded to the overlapped elongated 15 frame profile arrangement (20a-20d, 70) by means of a structural adhesive(45a). Said overlapping edges (8a-8d) of the vacuum insulated glass unit (1) are allowed to thermally deflect (DIS4) relative to said elongated frame profiles (20a-20d, 70) in a deflection direction (D1, D2) perpendicular to said frame opening plane (P2) due to a temperature difference ($\Delta T=T1-T2$) between the two glass sheets (2a, 2b), and wherein said allowed thermal deflection of the overlapping edges (8a-8d) is allowed to have a varying magnitude along the edge (8a-8d) between the corners (9) where the respective edge (8a-8d) terminates. The present disclosure additionally relates to a vacuum insulated glass unit.

21 Claims, 12 Drawing Sheets

(30) Foreign Application Priority Data

| Jan. 14, 2019 | (DK) | PA201970022 |
|---|---|---|
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.

| *E04D 13/035* | (2006.01) |
|---|---|
| *E06B 3/02* | (2006.01) |
| *E06B 3/14* | (2006.01) |
| *E06B 3/54* | (2006.01) |
| *E06B 3/62* | (2006.01) |
| *E06B 3/66* | (2006.01) |
| *E06B 3/677* | (2006.01) |
| *E06B 7/23* | (2006.01) |

(52) U.S. Cl.
CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(56) References Cited

U.S. PATENT DOCUMENTS

| 2,781,561 | A | | 2/1957 | Gifford | |
| 3,686,795 | A | | 8/1972 | La Barge | |
| 3,861,085 | A | | 1/1975 | Jacob | |
| 4,134,234 | A | | 1/1979 | Auger | |
| 4,134,238 | A | * | 1/1979 | Auger | E06B 3/5409 |
| | | | | | 52/656.5 |
| 4,193,236 | A | * | 3/1980 | Mazzoni | E06B 3/66342 |
| | | | | | 52/204.593 |
| 5,216,855 | A | * | 6/1993 | Richter | E06B 3/5821 |
| | | | | | 52/204.593 |
| 5,373,672 | A | | 12/1994 | Schulz | |
| 5,891,536 | A | * | 4/1999 | Collins | E06B 3/66304 |
| | | | | | 52/786.13 |
| 6,263,623 | B1 | | 7/2001 | Weiss | |
| 6,295,774 | B1 | * | 10/2001 | Lindgren | E04D 13/031 |
| | | | | | 52/204.1 |
| 6,435,360 | B1 | | 8/2002 | Anin | |
| 7,588,653 | B2 | * | 9/2009 | Crandell | E06B 3/24 |
| | | | | | 52/204.5 |
| 7,845,142 | B2 | * | 12/2010 | Theios | E06B 3/64 |
| | | | | | 52/204.6 |
| 7,950,192 | B2 | * | 5/2011 | Glover | B29C 66/72523 |
| | | | | | 52/204.593 |
| 8,181,405 | B2 | * | 5/2012 | Nash | E04F 11/1851 |
| | | | | | 52/800.18 |
| 9,447,627 | B2 | | 9/2016 | Thompson | |
| 10,415,302 | B2 | * | 9/2019 | Vander Bent, Jr. | E06B 3/5409 |
| 10,597,933 | B2 | * | 3/2020 | Abe | E06B 3/6612 |
| 10,919,236 | B2 | * | 2/2021 | Vaccari | E06B 3/5454 |
| 11,060,341 | B1 | * | 7/2021 | Sprague | E06B 3/549 |
| 11,285,703 | B2 | * | 3/2022 | Jørgensen | B32B 41/00 |
| 11,802,435 | B2 | * | 10/2023 | Özden | E04D 13/0315 |
| 2005/0126093 | A1 | * | 6/2005 | Wagner | E04D 13/0305 |
| | | | | | 52/200 |
| 2007/0032972 | A1 | * | 2/2007 | Glover | B29C 65/7841 |
| | | | | | 702/77 |
| 2009/0324858 | A1 | * | 12/2009 | Jaeger | E06B 3/6612 |
| | | | | | 156/107 |
| 2012/0137607 | A1 | | 6/2012 | Kristensen | |
| 2013/0101759 | A1 | * | 4/2013 | Jones | E06B 3/6612 |
| | | | | | 428/34 |
| 2014/0007396 | A1 | | 1/2014 | Jones | |
| 2014/0069034 | A1 | * | 3/2014 | Jones | E06B 3/585 |
| | | | | | 52/204.593 |
| 2015/0345207 | A1 | | 12/2015 | Thompson | |
| 2017/0002599 | A1 | * | 1/2017 | Thompson | E06B 3/5454 |
| 2017/0268285 | A1 | * | 9/2017 | Abe | C03C 27/10 |
| 2022/0065026 | A1 | * | 3/2022 | Özden | E06B 3/62 |

FOREIGN PATENT DOCUMENTS

| DE | 3202639 | A1 | | 8/1983 | |
| DE | 102006020455 | A1 | | 6/2007 | |
| DE | 202009016113 | U1 | | 5/2011 | |
| DE | 202012006687 | U1 | * | 12/2013 | E05C 1/04 |
| DE | 10201400186 | A1 | | 2/2016 | |
| EP | 0418461 | A1 | | 3/1991 | |
| EP | 0421239 | A2 | | 4/1991 | |
| EP | 0472109 | A2 | | 2/1992 | |
| EP | 1298100 | A1 | | 4/2003 | |
| EP | 1908914 | A1 | | 4/2008 | |
| EP | 2169172 | A2 | | 3/2010 | |
| EP | 2921632 | A1 | | 9/2015 | |
| EP | 3101195 | A1 | | 12/2016 | |
| EP | 3124733 | A1 | | 2/2017 | |
| EP | 3170799 | A1 | | 5/2017 | |
| FR | 2514057 | A1 | | 4/1983 | |
| FR | 2823789 | A1 | | 10/2002 | |
| FR | 2942843 | A1 | | 9/2010 | |
| FR | 3075245 | A1 | * | 6/2019 | E06B 3/5454 |
| GB | 2264742 | A | * | 9/1993 | E06B 3/5481 |
| GB | 2492380 | A | | 1/2013 | |
| GB | 2521419 | A | | 6/2015 | |
| JP | 2000064732 | A | * | 2/2000 | E06B 3/6205 |
| JP | 2001146881 | A | | 5/2001 | |
| JP | 2002021437 | A | | 1/2002 | |
| JP | 2007132637 | A | | 5/2007 | |
| KR | 20180128659 | A | | 12/2018 | |
| WO | WO-9914169 | A1 | * | 3/1999 | C03C 27/06 |
| WO | WO-2011048559 | A1 | * | 4/2011 | E04B 2/7401 |

(56) References Cited

FOREIGN PATENT DOCUMENTS

| WO | 2014039642 A1 | 3/2014 | |
|---|---|---|---|
| WO | WO-2014183606 A1 * | 11/2014 | ........... E06B 3/6621 |
| WO | 2015183863 A1 | 12/2015 | |
| WO | 2017210701 A1 | 12/2017 | |
| WO | WO-2020147906 A1 * | 7/2020 | ......... E04D 13/0351 |
| WO | WO-2020147907 A1 * | 7/2020 | ......... E04D 13/0351 |
| WO | WO-2021228713 A1 * | 11/2021 | ............. E04D 13/03 |

OTHER PUBLICATIONS

International Search Report for corresponding application PCT/DK2020/050009 filed Jan. 13, 2020; Mail date Mar. 30, 2020.
International Search Report for corresponding application PCT/DK2020/050010 filed Jan. 13, 2020; Mail date Mar. 25, 2020.
International Search Report for corresponding application PCT/DK2020/050011 filed Jan. 13, 2020; Mail date Apr. 7, 2020.
International Search Report for corresponding application PCT/DK2020/050012 filed Jan. 13, 2020; Mail date Apr. 9, 2020.
International Search Report for corresponding application PCT/DK2020/050013 filed Jan. 13, 2020; Mail date Mar. 19, 2020.
International Search Report for corresponding application PCT/DK2020/050014 filed Jan. 13, 2020; Mail date Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; Mail date Apr. 1, 2020.
International Search Report for corresponding application PCT/DK2020/050017 filed Jan. 13, 2020; Mail date Feb. 18, 2020.
International Search Report for corresponding application PCT/DK2020/050018 filed Jan. 13, 2020; Mail date Feb. 18, 2020.
Written Opinion for corresponding application PCT/DK2020/050008 filed Jan. 13, 2020; Mail date Apr. 3, 2020.
Written Opinion for corresponding application PCT/DK2020/050009 filed Jan. 13, 2020; Mail date Mar. 30, 2020.
Written Opinion for corresponding application PCT/DK2020/050010 filed Jan. 13, 2020; Mail date Mar. 25, 2020.
Written Opinion for corresponding application PCT/DK2020/050011 filed Jan. 13, 2020; Mail date Apr. 7, 2020.
Written Opinion for corresponding application PCT/DK2020/050012 filed Jan. 13, 2020; Mail date Apr. 9, 2020.
Written Opinion for corresponding application PCT/DK2020/050013 filed Jan. 13, 2020; Mail date Mar. 19, 2020.
Written Opinion for corresponding application PCT/DK2020/050014 filed Jan. 13, 2020; Mail date Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; Mail date Apr. 1, 2020.
Written Opinion for corresponding application PCT/DK2020/050017 filed Jan. 13, 2020; Mail date Feb. 18, 2020.
Written Opinion for corresponding application PCT/DK2020/050018 filed Jan. 13, 2020; Mail date Feb. 18, 2020.

* cited by examiner

FRAME ASSEMBLY COMPRISING A VACUUM INSULATED GLASS UNIT FIXED TO A FRAME BY MEANS OF A STRUCTURAL ADHESIVE

The present disclosure relates to a vacuum insulated glass unit frame assembly comprising a rectangular vacuum insulated glass unit and a frame, and a vacuum insulated glass unit.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit.

Patent documents U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a part of the frame. It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple and/or, mechanical solution for holding a VIG unit in/at a frame, provide a solution that may be used under varying climatic conditions, and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is normally subjected to significant temperature differences DT between the VIG unit glass sheets due to the good insulation capabilities of the VIG unit. As the edge seal for sealing the gap between the VIG unit glass sheets is normally very stiff in nature, the temperature difference DT between the glass sheets causes the VIG unit to deflect (also known as thermal bending, thermal deflection or thermal distortion), as the hotter glass sheet of the VIG unit will expand compared to the colder of the glass sheets.

VIG units according to aspects of the present disclosure may in aspects of the present discourse provide a $U_g$-value below 0.7 W/(m$^2$K), such as below 0.6 W/(m$^2$K), e.g. below 0.5 W/(m$^2$K) such as below 0.4 W/(m$^2$K), and such VIG units may suffer from increased thermal deflection due to the good insulation provided by means of the VIG unit. This low Ug-value may be obtained by means of the evacuation of the gap between the VIG glass sheets, e.g. in combination with one or more one or more of One or more low-e coatings such as thin tin dioxide or thin silver layers or any other suitable low e-coating layers at e.g. the inner surface(s) of the glass sheets of the VIG unit facing the VIG unit gap, a larger/increased support structure distance, such as above 3 or above 4 centimetres between neighbouring support structures in the VIG unit gap to reduce the number of potential "cold-bridges" provided by the support structures, by using support structures of a material having a low thermal conductivity and/or a small size, By providing a 3-layer VIG unit (i.e. with two evacuated gaps placed between a middle glass sheet and a glass sheets arranged at and parallel to opposite surfaces of the middle glass sheet)

By providing a Hybrid VIG unit.

The present disclosure relates to a vacuum insulated glass (VIG) unit frame assembly, wherein said vacuum insulated glass unit frame assembly comprises a rectangular vacuum insulated glass unit comprising two glass sheets separated by a gap between said glass sheets, wherein a plurality of support structures are distributed in said gap and wherein said gap is sealed, and a frame comprising elongated frame profile arrangements arranged to provide a frame opening extending in a frame opening plane defined between the elongated frame profile arrangements.

A plurality of edges of said rectangular vacuum insulated glass unit overlaps an elongated frame profile arrangement of said frame, and an inwardly directed, major surface of a glass sheet of the vacuum insulated glass unit is bonded to the overlapped elongated frame profile arrangement by means of a structural adhesive. The overlapping edges of the vacuum insulated glass unit are allowed to thermally deflect relative to said elongated frame profiles in a deflection direction perpendicular to said frame opening plane due to a temperature difference between the two glass sheets, and said allowed thermal deflection of the overlapping edges is allowed to have a varying magnitude along the edge between the corners where the respective edge terminates.

A temperature difference between the outer, major surfaces of the VIG unit glass sheets may provide the thermal deflection of the VIG unit edges, and the amount of thermal deflection is dependent on the size of the temperature difference $DT=T1-T2$, where T1 is the temperature at one outer major/main surface of the VIG, and the temperature T2 is the temperature at the other outer major/main surface of the VIG. The operational sign of the resulting temperature difference DT determines to which side of the VIG unit assembly the VIG unit's edges deflects relative to the frame opening plane due to the temperature difference. Hence, the VIG unit will tend to thermally deflect over time due to a temperature difference between the outer major surfaces of the VIG glass sheets. This temperature difference may change over time, and may induce varying magnitudes of deflection and stresses in the VIG unit.

Simulations indicate that an inappropriate constraining of the VIG unit's thermal deflection along/at the VIG unit edges by the frame assembly may induce a larger stress at the VIG unit edges or corner areas, such as in an edge sealing the VIG unit gap of the VIG unit at the glass sheet edges. This may increase the risk that the VIG unit is damaged over time, so that the reduced pressure in the gap of the VIG unit is released to be that of the ambient pressure of the VIG unit, and this requires a replacement of the entire VIG unit.

The present inventors have in steady state simulations of a rectangular VIG unit's thermal deflection seen that the VIG edges tend to describe an "edge deflection curve" when the VIG unit is subjected to temperature differences, and this may be caused by the properties of the VIG unit such as the rigidity of the edge sealing solution for sealing the evacuated VIG gap along the edges of the VIG unit. Tests confirmed that such edge deflection curves occur when the VIG unit is subjected to temperature differences.

At the same time, the VIG unit should be kept sufficiently in the frame assembly so that it does not permanently displace to an undesired position due to gravity or when outer forces such as wind gusts (in case it is e.g. used for a door or a window), hails or other objects such as birds, balls or the like provides impacts such as sudden impacts on the VIG unit surface.

As the overlapping edges of the VIG unit that overlaps the frame are allowed to thermally deflect, this may help to reduce stresses in the VIG unit and hence help to improve the lifetime of the VIG unit frame assembly, and/or help to provide a solution that may be used in varying conditions such as in varying climatic conditions.

At the same time, a good insulation may be provided by the frame solution as the overlapping edges of the VIG unit are may be placed with a large distance to the frame opening compared to e.g. solutions where a recess in a frame receives the edge without e.g. compromising the size of the frame opening. This may especially be relevant for VIG unit applications as the edge sealing of the VIG unit which seals the evacuated gap may provide a "cold bridge" providing a poor insulation of the VIG unit at the area of the edge seal. This solution with the overlapping edges may moreover help to provide a space saving frame solution providing that edges of neighbouring VIG units attached to each their VIG unit frame assembly may be arranged closer together.

The structural adhesive provides a sufficient bonding to the frame so that the outwardly facing surface if the VIG unit facing away from the frame does not need to be bonded or in other ways fixed to the frame. Hence, the present solution may help to provide e.g. aesthetic advantages.

The VIG unit frame assembly may in one or more aspects of the present disclosure e.g. be a building aperture cover such as a window, or a door.

In one or more aspects of the present disclosure, said frame comprises substantially parallel, elongated top and bottom frame profile arrangements, and substantially parallel, elongated side profile frame arrangements, and wherein two, three or all of said elongated frame profile arrangements are overlapped by said vacuum insulated glass unit and fixed to the respective, overlapped elongated frame profile arrangement by means of said structural adhesive.

In one or more aspects of the present disclosure all four edges of said vacuum insulated glass unit may be allowed to thermally deflect in a deflection direction perpendicular to said frame opening plane due to a temperature difference between the two glass sheets.

The VIG unit edges may in aspects of the present disclosure be attached to the frame by the structural adhesive so that, it is able to move/deflect in both directions relative to the frame opening plane dependent on the "operational sign" of the temperature difference $DT=T1-T2$, i.e. dependent on which of the glass sheets of the vacuum insulated glass unit that encloses the evacuated gap is the hottest of the two glass sheets. In one or more aspects of the present disclosure, said vacuum insulated glass unit frame assembly is a building aperture cover such as a window or a door, and the structural adhesive may be attached to the outer, major surface of the vacuum insulated glass unit configured to face the interior of the building.

This may e.g. provide a solution that may provide aesthetic advantages and provides a simpler mechanical solution for a building aperture cover. In one or more aspects of the present disclosure, an outer, outwardly facing major surface of the vacuum insulated glass unit which is arranged opposite to and faces away from the overlapped, elongated frame profile arrangements is substantially uncovered by the frame. This solution may provide a desired aesthetic appearance as the outwardly facing major surface of the VIG unit arranged opposite to and facing away from the overlapped, elongated frame profile arrangements is substantially uncovered by the frame and thus not fixed to the frame by for example a structural adhesive. Hence, e.g. several of the frame assemblies may be arranged next to each other to provide the impression of a single glass pane of fa ade.

In one or more aspects of the present disclosure, said structural adhesive may be a Silane-terminated polyurethane adhesive, a Modified-Silyl Polymer adhesive or a silicone adhesive.

Such adhesive materials may provide strong adhesive properties while at the same time allowing a movement such as a compression or stretching of the adhesive material when thermal deflections of the VIG unit occurs. The silicone adhesive may allow a larger compression or stretching than the SPUR or SMP adhesives. In one or more aspects of the present disclosure, said structural adhesive may extend between two parallel opposing edges of the vacuum insulated glass unit and along and substantially parallel to one or both further edge of the vacuum insulated glass unit, and wherein said structural adhesive extends along said one or both further edge for at least 30%, such as at least 40%, such as at least 50% of the length of said further edge or edges. This may e.g. help to provide a sufficient bonding of the VIG unit to the frame. In one or more aspects of the present disclosure, said structural adhesive extends between two parallel opposing edges of the vacuum insulated glass unit and along and substantially parallel to one or both further edge of the vacuum insulated glass unit, and wherein said structural adhesive extends along said one or both further edge for less than 90%, such as less than 80%, e.g. less than 70% of the length of said further edge or edges.

This may e.g. help to allow an increased deflection of the VIG unit edge at desired locations, and/or help to spare adhesive material.

In one or more aspects of the present disclosure, the accumulated length of the structural adhesive extending between the two parallel opposing edges of the vacuum insulated glass unit may be between 30% and 90%, such as between 40% and 80% of the length of the edge of the vacuum insulated glass unit along which the structural adhesive extends. In one or more aspects of the present disclosure, said structural adhesive may be discretely arranged along the length of one or more edges of the vacuum insulated glass unit.

This may e.g. help to allow an increased deflection of the VIG unit edge at desired locations, and/or help to spare adhesive material. In one or more aspects of the present disclosure, said discretely arranged structural adhesive for each of said edges comprises two strips of structural adhesive placed to adhere to said vacuum insulated glass unit at discrete fixation areas distributed along said edges of the vacuum insulated glass unit overlapping the elongated frame arrangements, where said discrete fixation areas terminate at least between 4% and 20%, such as between 8% and 15% of the length of the respective edge of the vacuum insulated glass unit from the respective corner of the vacuum insulated glass unit where the edge terminates.

This may help to provide a solution where the VIG unit is sufficiently fixed in the frame assembly, where forces acting on the VIG unit is transferred to the frame such as to frame profiles through the structural adhesive, and where an increased thermal deflection of the VIG unit edges are at the same time allowed towards the frame due to the structural adhesive being discretely arranged along the edge.

Also or alternatively, by selecting discrete pane fixation points distributed along the edges/narrow edges of the vacuum insulated glass unit, and providing fixation arrangements at these points which fixates/holds the vacuum insulated glass unit to the frame, this may help to reduce the stresses in the VIG unit such as in the VIG unit edge seal when the VIG unit is subjected to temperature differences between the outer major surfaces of the VIG unit.

In aspects of the present disclosure, said inwardly facing surface at each of two opposing longer edges may be attached to said frame by two strips, and no more, of said structural adhesive distributed in the longitudinal direction of said longer edges, such as wherein no structural adhesive fixates the inwardly facing surface along shorter opposing edges to the frame. In aspects of this aspect, the length ratio between the shorter opposing edges and the longer opposing edges may be in the range of 0.3 to 0.7, preferably in the range of 0.35 to 0.6. This may e.g. provide a simple solution where stresses in the VIG unit, such as in the edge sealing and/or at the corner areas may be reduced.

In one or more aspects of the present disclosure, said discrete fixation points/areas are placed so that a centre portion of said vacuum insulated glass unit along said edge of edges is not bonded to the to the overlapped elongated frame profile arrangement wherein said centre portion extends between 10% and 50%, such as between 15% and 35% of the length of the respective edge of the vacuum insulated glass unit.

The present inventors have seen in steady state VIG unit deflection computer simulations that a thermal deflection at the edges of the VIG unit may seems to follow a pattern where discrete, so to say"neutral", deflection points may be estimated/selected as fixation points for an edge. At these locations, the amount of (unrestricted) thermal deflection of the edge relative to a straight, common line extending through the discrete fixation points of the respective edge, may be substantially equal in both directions relative to the straight common line.

This may help to provide a narrower frame solution, and/or help to spare or reduce the size of sealings or gaskets placed to provide water and/or air tightening functions between the VIG unit and one or more parts of the frame assembly. Also or alternatively, it may help to allow an increased deflection of the VIG unit edge overlapping the frame.

It is understood that a space at the areas of the edges that not bonded to the overlapped elongated frame profile arrangement in certain aspects may be filled by a soft gasket, (e.g. foam or soft rubber) in aspects of the present disclosure, but it may also be left empty. In one or more aspects of the present disclosure, said structural adhesive may have a thickness between 3 mm and 30 mm, such as between 4 mm and 20 mm, such as between 5 mm and 15 mm, such as between 5 and 10 mm at a temperature difference ($\Delta T=T1-T2$) between the two glass sheets of 0° C. In one or more aspects of the present disclosure, said structural adhesive may have a thickness of at least 4 mm, such as at least 5 mm, such as at least 7 mm, for example at least 9 mm at a temperature difference (DT=T1−T2) between the two glass sheets of 0° C.

This may provide an adhesive which may be have a thickness that is large enough to take up at least some of the thermal deflection of the VIG unit's edges by either compression or expansion/stretching of the structural adhesive, and at the same time provide a narrow frame solution. This thickness may e.g. be measured when the frame assembly is arranged vertically or horizontally so that the VIG unit applies a gravity force onto the structural adhesive.

In one or more aspects of the present disclosure, said structural adhesive may be configured to be compressed and/or expand/be stretched due to said thermal edge deflection. This provides a fixation of the VIG unit to the frame while also allowing the thermal deflection of the overlapping edges. Hence, this may help to provide a reduced stress condition in the VIG unit while providing a solution with a desired aesthetic appearance.

In one or more aspects of the present disclosure, said structural adhesive may be omitted at the corner areas of the vacuum insulated glass unit, thereby providing a deflection space between a part of the frame and the vacuum insulated glass unit into which the respective corner area of the vacuum insulated glass unit will deflect during said thermal deflection.

This may e.g. help to provide a more space saving solution as the adhesive may only be suitable for allowing a certain amount of movement, such as a compression or stretching due to the thermal deflection. The corner areas of the VIG unit may tend to provide a larger thermal deflection than other parts of the edge of the VIG unit, and omitting the adhesive at this area may provide a solution where the thickness of the adhesive may be reduced while at the same time allowing a larger edge deflection. This may e.g. help to allow an increased edge deflection and a space saving solution when the corner areas of the VIG unit thermally deflects in a direction towards the overlapped part of the elongated frame arrangement.

The corner areas of the VIG unit may e.g. comprise the 15%, such as the 10%, e.g. the 5% of the VIG unit edge nearest the respective corner of the VIG unit.

In further aspects of the present disclosure, a gasket or sealing material which is softer than the structural adhesive may be arranged in the deflection space so as to e.g. provide a water/condense tightening functionality.

It is understood that the height of said deflection space determined between the VIG unit surface facing the frame and a surface of the frame may correspond to the thickness of the structural adhesive.

In one or more aspects of the present disclosure, said inwardly facing surface of the vacuum insulated glass unit may be fixed to a holding member by means of said structural adhesive, and wherein said holding member is a part of said elongated frame profile arrangements.

This may e.g. be advantageous from a manufacturing perspective and/or in relation to provide a solution where the vacuum insulated glass unit may more easily be replaced in the frame.

In one or more aspects of the present disclosure, a frame wall is arranged opposite to said overlapping edge or edges, and wherein a sealing material is placed between said frame wall and said overlapping edge so as to provide a water tight seal between said frame wall and said vacuum insulated glass unit. This may e.g. help to provide a desired aesthetic appearance of the frame assembly, e.g. in cases where an outer, outwardly facing major surface of the vacuum insulated glass unit which is arranged opposite to and faces away from the overlapped, elongated frame profile arrangements is substantially uncovered by the frame. Also or alternatively. Also/or alternatively it may help to provide good sealing properties and/or help to provide a space saving solution. The frame wall may also help to provide a mechanical protection of the edges of the VIG unit during e.g. installation.

In one or more aspects of the present disclosure, said frame wall is part of an elongated profile comprising said holding member. This may e.g. provide a simple and cost efficient solution and/or a solution that is simple to manufacture in a larger scale. The frame wall and holding member may e.g. together form an L-shape. In further aspects of the present disclosure, said holding member may be part of an elongated profile comprising a sash connection part such as one or more walls connecting the holding member to said elongated frame profile arrangements.

Mechanical fasteners (not illustrated) such as screws or nails, one or more snap connections, one or more tongue and groove connections and/or the like may attach the sash connection part to the overlapped sash profile. The sash connection part may also or alternatively be connected to the profile by means of an adhesive. The sash connection part may e.g. be connected to this profile at a location or surface that is different from the surface of the sash profile facing the VIG unit, such as a side surface of the sash profile.

In one or more aspects of the present disclosure, a flexible connection arrangement connects the holding member to said elongated frame profile arrangements, wherein said flexible connection arrangement is configured to flex when said vacuum insulated glass unit exerts a bending moment on the holding members, so that said holding member will move relative to the elongated frame profile arrangement to which the holding member is connected. The flexible connection arrangement is configured to flex when the VIG unit is subjected to temperature differences between the VIG unit glass sheets enclosing the evacuated gap. This allows a thermal deflection of the VIG unit relative to the elongated profiles to which the holding member is connected by means of the flexible connection arrangement. This may help to provide a longer lasting VIG unit, which may e.g. last longer despite being subjected to varying temperature differences. Also or alternatively, it may provide a more cost efficient solution as the same frame assembly may be used in a range of varying climates, and/or in that the same frame assembly system may be utilized for varying sizes of VIG units.

The flexible connection arrangement may thus be deflected by the VIG unit's thermal deflection changes due to a varying temperature difference between the VIG unit glass sheets, hence allowing the VIG unit and the edges of this to thermally deflect.

In one or more aspects of the present disclosure, said flexible connection arrangement may comprise one or more wall members configured to provide said flexing, such as wherein a wall member of said one or more wall members of the flexible connection arrangement is configured to provide or support said holding member. This may e.g. help to provide a space saving and/or more simple, mechanical solution.

In one or more aspects of the present disclosure, a flexing space may be provided between said inwardly directed, major surface to which said structural adhesive is attached and said overlapped, elongated frame profile arrangements to which the holding member is connected, and wherein said vacuum insulated glass unit is configured to flex towards and away from said flexing space in response to said bending moment. Hence, when the flexing due to said bending moment exerted by the vacuum insulated glass unit, and caused by a thermal deflection of the VIG unit edge is provided, the resulting movement of the VIG unit may be allowed into and away from the flexing space. This may e.g. help to provide a space saving frame solution, and/or help to provide a flexible frame solution that can flex in response to the bending moment subjected to the holding member due to a thermal deflection of the VIG unit. In aspects, the holding member may also be arranged so as to flex towards and away from the flexing space in response to said bending moment.

In one or more aspects of the present disclosure, one or more walls of the flexible connection arrangement may provide the flexing space and thus suspend the VIG unit from the elongated, overlapped frame profile arrangement.

In one or more aspects of the present disclosure, a resilient gasket or seal member may be arranged between said frame opening and said structural adhesive so as to provide a tightening between said frame and an outer surface of the vacuum insulated glass unit. In aspects of the present disclosure, said resilient gasket or seal member may comprise one or more resilient, deflectable lips or a compressible gasket configured to follow the of the vacuum insulated glass unit when it is subjected to a temperature difference (DT) between the VIG unit glass sheets enclosing the evacuated gap. This may help to provide a substantially watertight and/or airtight tightening between said frame and an outer surface of the vacuum insulated glass unit.

The gasket/seal may provide a seal irrespectively of the variation in or amount of thermal deflection of the VIG unit in the frame, as it has a resiliency that causes it to fill out a gap/space between the VIG unit and a part of the frame assembly.

The seal/gasket or seals/gaskets may in one or more aspects of the present disclosure follow the deflection of the vacuum insulated glass unit due to the seal or gasket being arranged in a pre-deflected or pre-compressed state at the frame assembly. Thus, the seal will be further compressed/deflected or decompressed/deflect less as the VIG unit edge thermally deflect due to a temperature difference variation.

The gasket/seal may in aspects of the present disclosure either be deflected lips or it may be a compressible foam, rubber or silicone seal/gasket which in an uncompressed state has a larger volume, width and/or height than in the pre compressed state.

The amount of deflection or compression of the gasket/gasket may vary along the gasket/seal(s) as the VIG unit thermally deflect and changes due to a temperature difference variation between the VIG unit's glass sheet enclosing the evacuated gap.

In one or more aspects of the present disclosure, the largest total edge deflection of any of said overlapping edges of the vacuum insulated glass unit at a temperature difference ($DT=T1-T2$) between the two glass sheets of 65° C. as compared to the vacuum insulated glass unit at a temperature difference ($DT=T1-T2$) of 0° C. is at least 2 mm, such as in the range of 2 to 40 mm, such as in the range of 5 to 35 mm, preferably in the range of 8 mm to 20 mm.

By the term "total edge deflection" is herein understood the largest distance in the direction perpendicularly to the frame opening plane between the any two positions of an edge of the vacuum insulated glass unit, which in some embodiments may be the sum of the largest distances of positions of the edge in question from the frame opening plane in e.g. each their direction from that plane, or towards or away from that plane.

In one or more aspects of the present disclosure, the largest total edge deflection of any of said overlapping edges of the vacuum insulated glass unit at a temperature difference between the two glass sheets of 40° C. as compared to the vacuum insulated glass unit at a temperature difference ($DT=T1-T2$) of 0° C. is at least 1 mm, such as in the range of 1 to 25 mm, such as in the range of 3 to 15 mm, preferably in the range of 4 to 12 mm.

It may be advantageous to allow an edge deflection in one or both of the above mentioned ranges (at a DT of 40° C. or 65° C.), as it may help to reduce the stress in the VIG unit over time, and also, it may help to provide a space saving, such as more narrow, frame solution.

In one or more aspects of the present disclosure, the largest total edge deflection of any of said overlapping edges of the vacuum insulated glass unit at a temperature difference ($DT=T1-T2$) between the two glass sheets of 65° C. as compared to the vacuum insulated glass unit at a temperature difference ($DT=T1-T2$) of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge.

In one or more aspects of the present disclosure, the largest total edge deflection of any of said overlapping edges of the vacuum insulated glass unit at a temperature difference ($DT=T1-T2$) between the two glass sheets of 40° C. as compared to the vacuum insulated glass unit at a temperature difference ($DT=T1-T2$) of 0° C. is at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

The above mentioned ranges of thermal deflections may e.g. provide a deflection of the edge that may help to reduce stresses in the VIG unit and e.g. help to reduce the risk of the VIG unit self-destructing, at least over time due to e.g. fatigue in a structure of the VIG unit over time due to varying temperature differences.

In one or more aspects of the present disclosure, said vacuum insulated glass unit may be a laminated vacuum insulated glass unit, where a lamination glass sheet, such as an annealed glass sheet, is laminated to an outer major surface of a glass sheet of the vacuum insulated glass unit by means of a lamination layer. Simulation results have indicated that even though a lamination glass sheet may restrict the thermal deflection of the VIG unit edges with between 30% to 60% compared to free bending where the lamination glass sheet is not present, it may still be relevant to allow said edge deflection in the frame, as stresses in the VIG unit glass sheets and/or the edge sealing may still become significant during thermal deflection.

In one or more aspects of the present disclosure, one or both of the VIG unit glass sheet enclosing the evacuated gap may be tempered glass sheets, e.g. thermally tempered glass sheets. A tempered glass sheet may provide increased safety and/or strength of the VIG unit. In other aspects of the present disclosure, at least one of said glass sheets of the VIG unit may be an annealed glass sheet.

In one or more aspects of the present disclosure, said vacuum insulated glass (VIG) unit frame assembly is a building aperture cover such as a door or a window, such as a roof window.

VIG units may generally provide good heat insulation and/or other advantages when compared to windows or doors comprising gas insulated glass units.

The present inventors have found that computer simulations revealed that in certain situations when a VIG unit is arranged in a roof window so that the major outer surfaces are not completely vertical, gravity acts on the VIG unit and may tend to cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present solution may be advantageous in order to also cope with such worse case scenarios. In In aspects of the present disclosure, the VIG unit frame assembly may be a window or door sash.

In one or more aspects of the present disclosure, a weakening arrangement of said frame, such as one or more perforations, slits/recesses, and/or unfilled spaces may be configured to provide that a resistance against the thermal deflection of the VIG unit edge may be substantially lower at corner parts of the edges than at centre parts of the edges.

In one or more aspects of the present disclosure, said overlapped elongated frame profile arrangement(s) are part of a sash, such as wherein said sash is attached to and configured to move relative to a frame configured to be attached to a building structure.

In one or more aspects of the present disclosure, said overlapping edges of the VIG unit may overlap both the elongated frame profiles of the movable sash and the fixed frame, but in other aspects of the present disclosure, the edges may alone overlap the sash. In further aspects, the sash may be fixed to the fixed frame, or the sash may be a part of the fixed frame. It is understood that the movable sash may be connected to the fixed frame by means of e.g. one or more hinge arrangements, and/or my means of one or more linear actuators such as electrically controlled actuators.

In one or more aspects of the present disclosure, the length of longer opposing edges of the vacuum insulated glass unit is in the range of 500 to 3000 millimetres, such as in the range of 600 to 1300 millimetres.

Such VIG units may suffer from larger edge deflections where it may be increasingly relevant to allow the VIG unit edges to thermally deflect. In one or more aspects of the present disclosure, the length ratio between shorter opposing edges and the longer opposing edges of the vacuum insulated glass unit may be in the range of 0.3 to 0.9, preferably in the range of 0.35 to 0.85.

Such VIG units may suffer from larger and even more complex edge deflections at the longer edges, compared to the shorter edges, and it may be increasingly relevant to allow these VIG unit edges to thermally deflect.

In one or more aspects of the present disclosure, said overlapped elongated frame profile arrangement is overlapped at least 20 mm, such as at least 50 mm, such as at least 80 mm. e.g. at least 100 mm by said VIG unit edge.

In one or more aspects of the present disclosure, said structural adhesive may be bonded to the vacuum insulated glass unit along and opposite to an edge seal of said vacuum insulated glass unit which seals the gap between the VIG unit glass sheets.

This may e.g. help to provide a good force transfer between the VIG unit and the frame, e.g. during the thermal deflection, and/or when the VIG unit is striked/hit by outer forces such as wind loads or objects. Also, it may help to spare the support structures in the evacuated gap or the area of the glass sheets on which the support structures supports.

In one or more aspects of the present disclosure, said structural adhesive may be configured to provide that the thermal deflection of the overlapping vacuum insulated glass unit edges is restricted as compared to free, un-constricted/un-restricted thermal deflection of the respective edge. Restricting the VIG unit edge completely from deflecting thermal may cause the VIG unit to break and the pressure in the evacuated gap to equalize to the ambient pressure. However, by restricting the VIG unit edge deflection to a certain amount compared to free deflection and no deflection, this may provide a solution where the VIG unit may be less likely to break over time due to thermal deflections. The largest total edge deflection may e.g. in aspects be restricted between 20% and 90%, such as between 40-70% compared to free, un-constricted thermal deflection of the respective edge. The restriction of the thermal bending/deflection of the VIG unit edges may in aspects be provided when larger temperature differences occur, such as temperature differences above 30° C., or above 40° C.

In one or more aspects of the present disclosure, a minimum distance may be provided in a space between said overlapped elongated frame profile arrangement and the surface of the vacuum insulated glass unit to which the structural adhesive bonds is at least 4 mm such at least 5 mm, for example at least 6 mm, at a temperature difference DT between the two glass sheets of the vacuum insulated glass unit of substantially 0° C., wherein said minimum distance is determined in a direction perpendicular to the outer major surface of the vacuum insulted glass unit. This may e.g. provide more space and/or deflection freedom in order to allow the VIG unit to thermally deflect relative to the frame. The minimum distance may provide a space in which a fixation system and/or a resilient tightening gasket is placed.

The present disclosure additionally, in a second aspect, relates to a vacuum insulated glass (VIG) unit comprising two glass sheets separated by a sealed gap between said glass sheets, wherein a plurality of support structures are distributed in said gap. The vacuum insulated glass (VIG) unit is attached to a plurality of elongated frame profile arrangements of a frame, wherein a frame opening extends in a frame opening plane defined between the elongated frame profile arrangements. The vacuum insulated glass (VIG) unit is arranged to cover the frame opening, and a plurality of edges of the vacuum insulated glass unit overlaps one or more, such as all, of said elongated frame profile arrangements of said frame. An inwardly directed, major surface of a glass sheet of the vacuum insulated glass unit is attached to the overlapped elongated frame profile arrangement by means of a structural adhesive, and said overlapping edges of the vacuum insulated glass unit are allowed to deflect thermally in a deflection direction perpendicular to said frame opening plane due to a temperature difference (DT=T1−T2) between the two glass sheets.

This may e.g. provide one or more effects as described previously.

In one or more aspects of said second aspect, said allowed thermal deflection of the overlapping edges is allowed to have a varying magnitude along the edge between the corners where the respective edge terminates.

The overlapping edge(s) of the vacuum insulated glass unit may in one or more aspects of said second aspect be allowed to deflect thermally relative to said overlapped elongated frame profiles.

The structural adhesive may in one or more aspects of the second aspect be configured to be compressed and/or expand when said overlapping edges deflects thermally. This may in aspects of the second aspect be provided that the structural adhesive has a thickness of at least 4 mm, such as at least 5 mm, such as at least 7 mm, for example at least 9 mm at a temperature difference (DT=T1−T2) between the two glass sheets of 0° C. The structural adhesive may in aspects of the second aspect be a Silane-terminated polyurethane (SPUR) adhesive, a Modified-Silyl Polymer (SMP) adhesive or a silicone adhesive.

Hence, the structural adhesive may take up at least a part of the thermal deflection of the overlapping edge. The structural adhesive may be compressed and/or expand further if the VIG unit is subjected to objects or wind loads striking the VIG unit.

Also or alternatively, in one or more aspects of the second aspect of the present disclosure, a flexible connection arrangement of said frame may connects a holding member attached to the VIG unit by means of said structural adhesive to the elongated frame profile arrangements such as a window sash. Said flexible connection arrangement is here configured to flex when said vacuum insulated glass unit exerts a bending moment on the holding members, so that said holding member will move relative to the elongated frame profile arrangement to which the holding member is connected. Hence, the flexible connection arrangement may take up at least a part of the thermal deflection of the overlapping edge. This may e.g. in further aspects of the second aspect be combined with the structural adhesive being configured to also be compressed and/or expand/be stretched when the overlapping edges deflects thermally.

FIGURES

Aspects of the present disclosure will be described in the following with reference to the figures in which:

FIG. 1: Illustrates a VIG unit frame assembly according to embodiments of the present disclosure, FIG. 2: illustrates schematically a VIG unit 1 to be arranged in a frame according to embodiments of the present disclosure, FIGS. 3-4: illustrates a thermally deflecting VIG unit according to embodiments of the present disclosure, FIG. 5: illustrates a thermally deflecting VIG unit subjected to varying temperature difference according to embodiments of the present disclosure, FIG. 6: illustrates a VIG unit bonded to a frame by means of a structural adhesive, according to embodiments of the present disclosure, FIGS. 7-8: illustrates a VIG unit bonded to a frame by means of a structural adhesive, and connected to a frame profile by means of a flexible connection arrangement, according to embodiments of the present disclosure, FIG. 9: illustrates an embodiment of the present disclosure where a holding member is configured to follow and deflect together with a thermal deflection of a VIG unit edge, FIGS. 10-11: illustrates a embodiments of the present disclosure where a deflection space is provided, FIG. 12: illustrates further embodiments of the present disclosure where a VIG unit is bonded to a frame by means of a structural adhesive, FIGS. 13-14: illustrates a laminated VIG unit bonded to a frame by means of a structural adhesive according to embodiments of the present disclosure, FIGS. 15-16: illustrates a hybrid VIG unit bonded to a frame according to embodiments of the present disclosure,

FIG. 17 and

Figure 17:
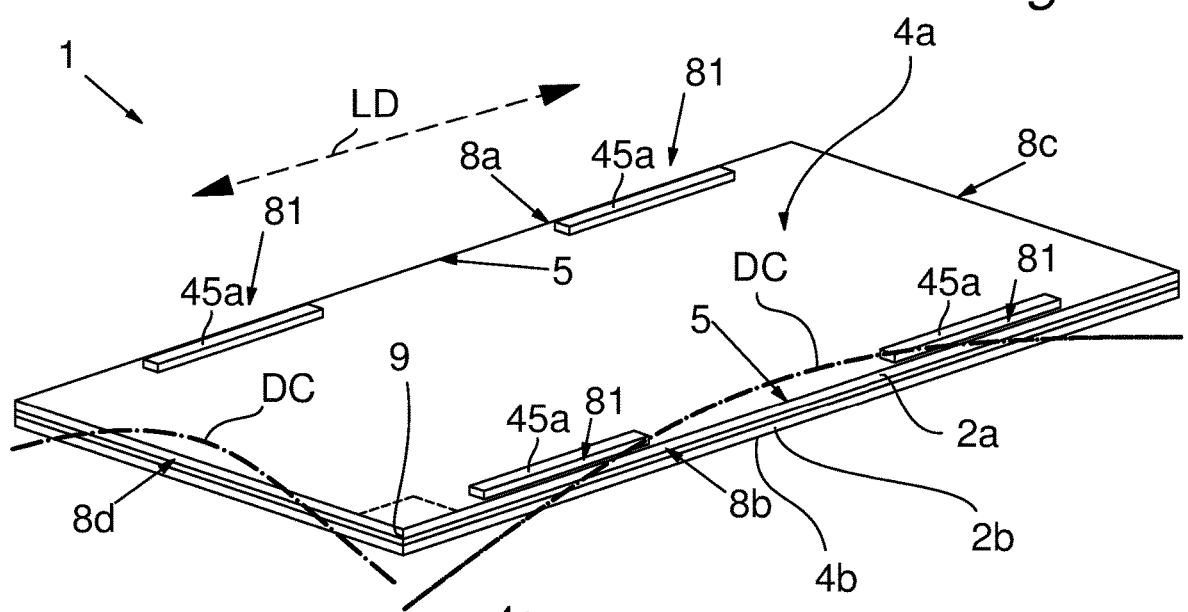
Figure 17A:
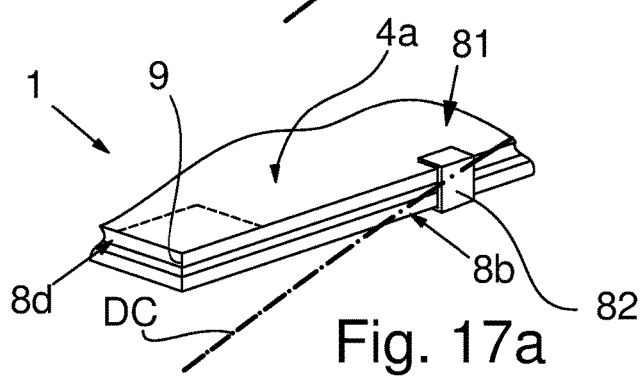
Figure 18:
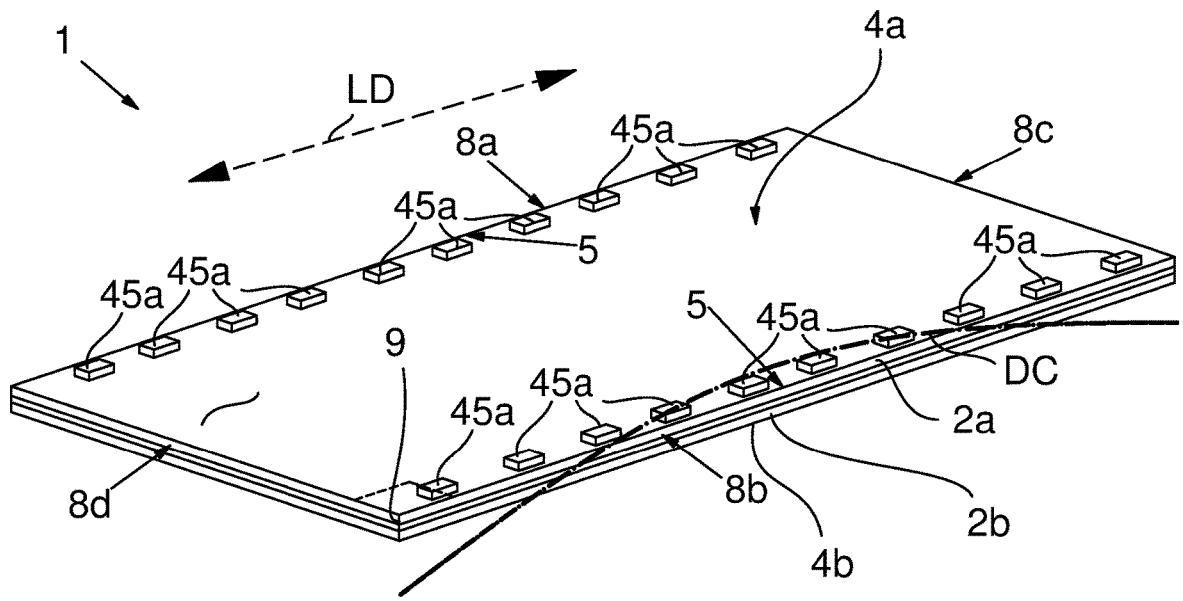
Figure 19:
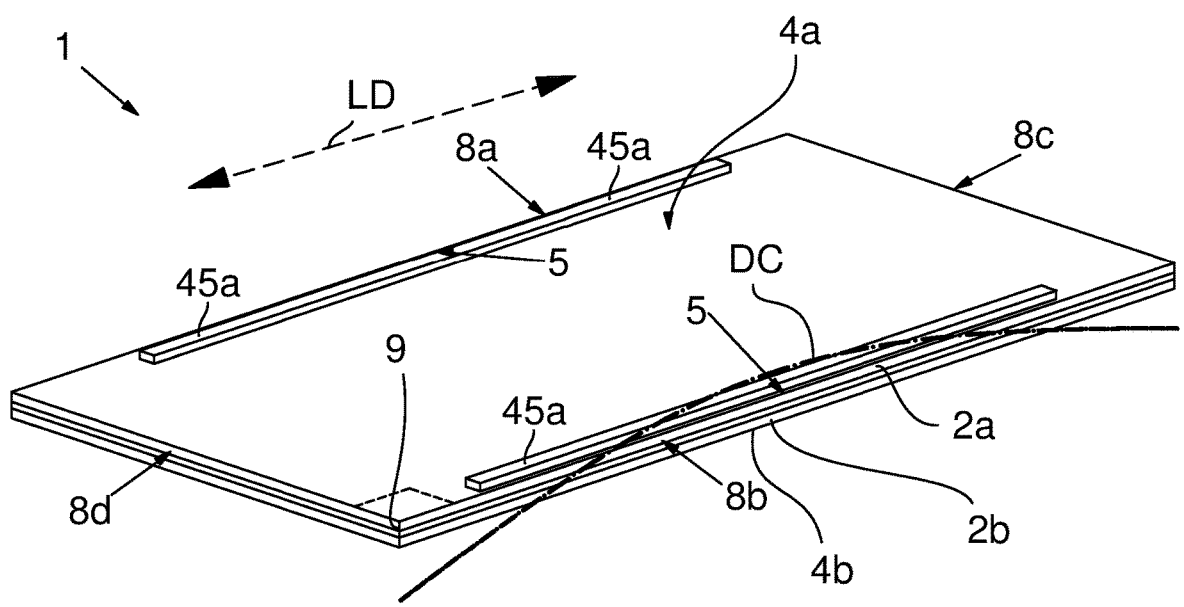
Figure 20:
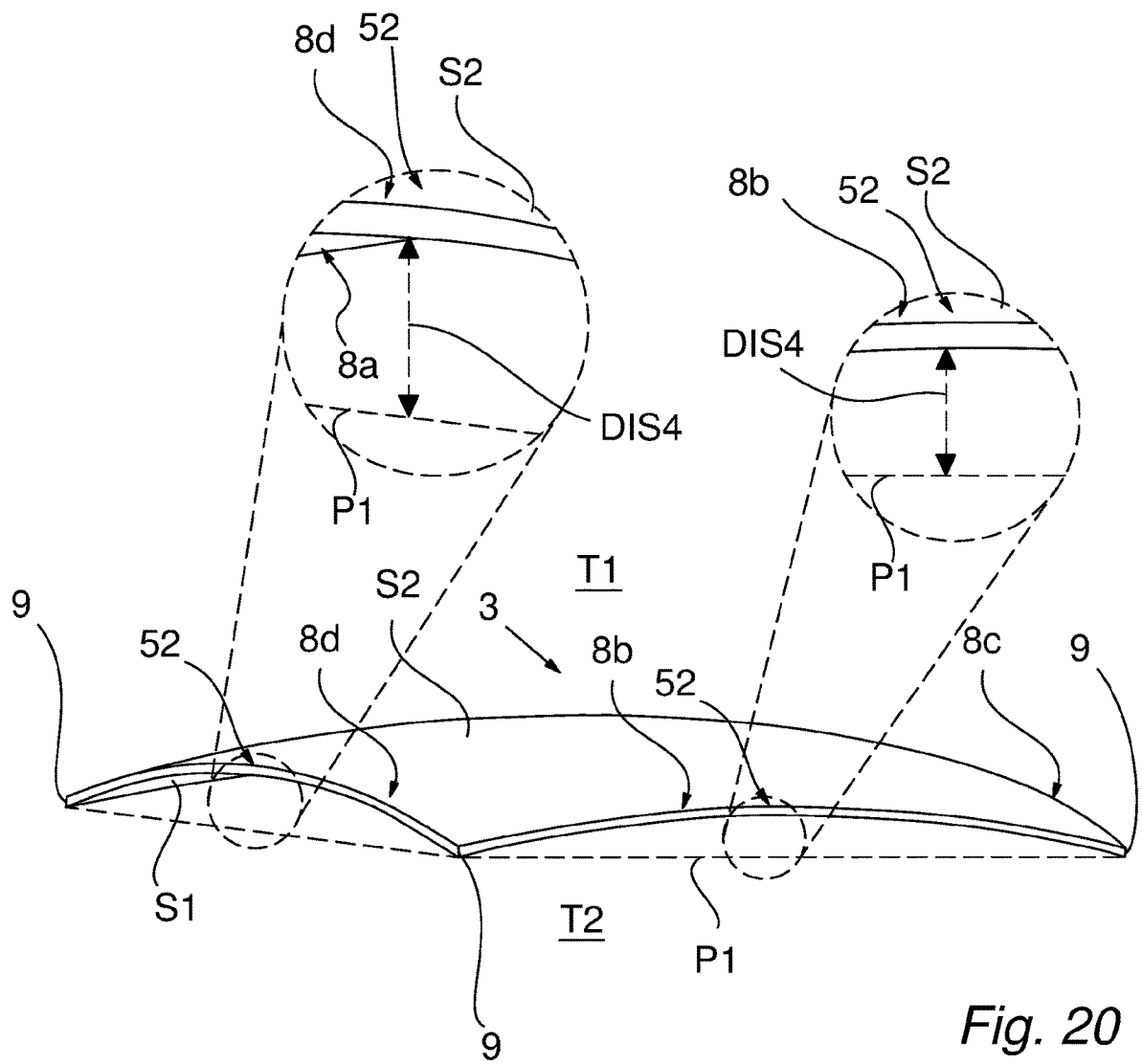
Figure 21:
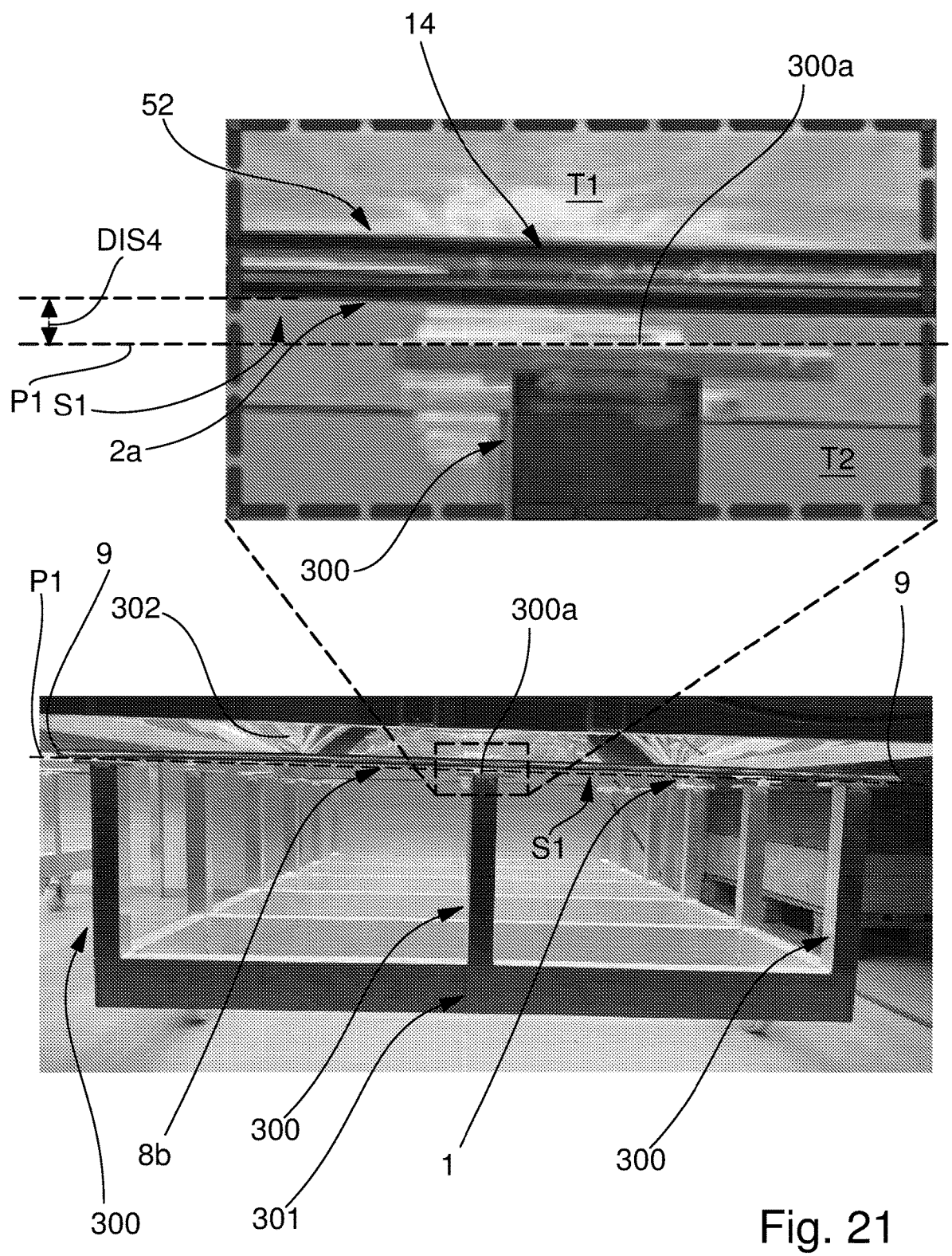
Figure 22:
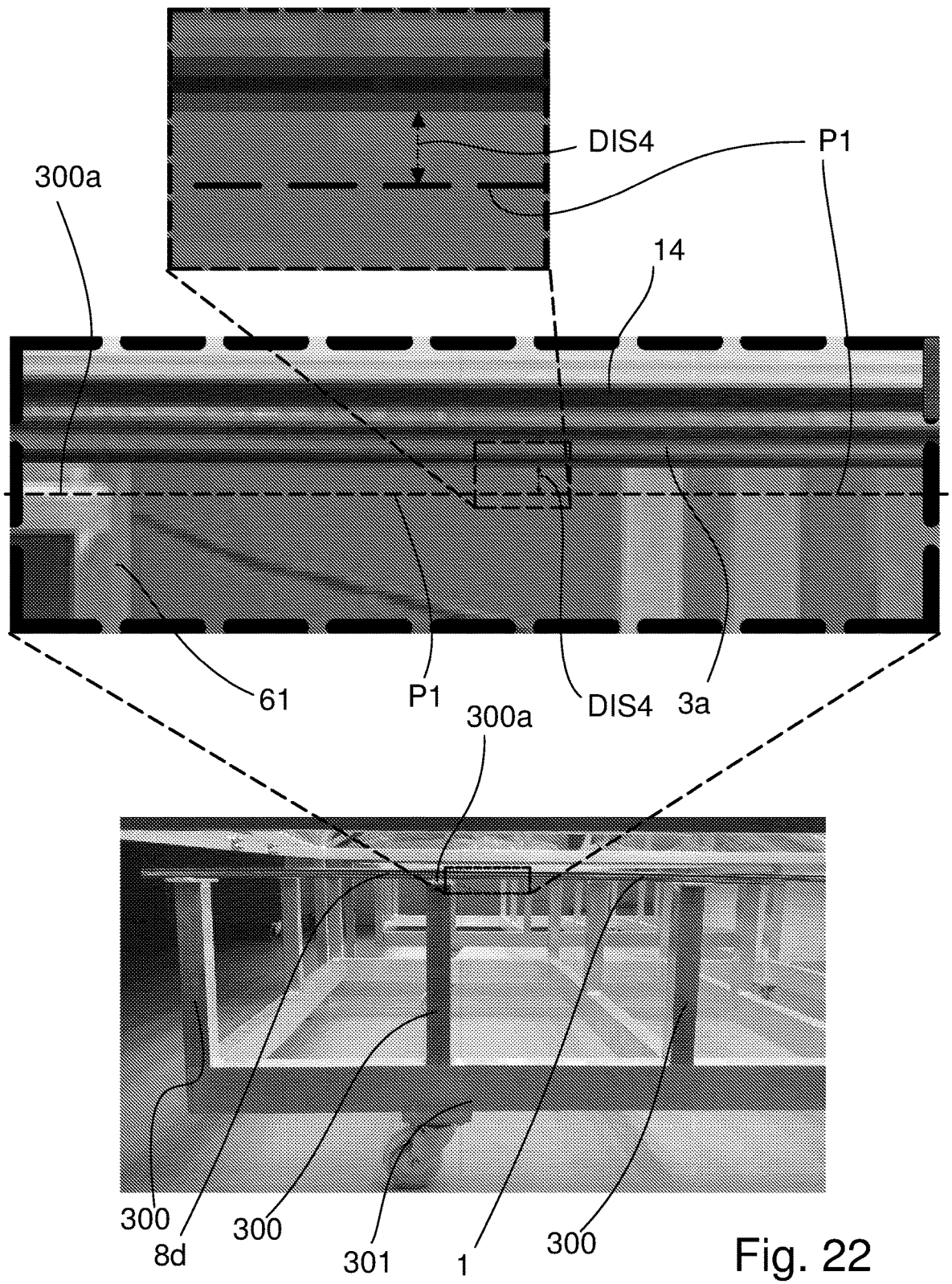

FIGS. 18-19: illustrates various embodiments of the present disclosure relating to the arrangement of a structural adhesive along two parallel, opposing edges, FIG. 17a: illustrates a holding device attached to a VIG unit at a fixation point, FIG. 20: illustrates a visualized computer simulation of a thermal deflection of a VIG unit, and FIGS. 21-22: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a vacuum insulated glass unit frame assembly 10 for use as e.g. a building aperture cover such as a window or a door according to embodiments of the present disclosure. The vacuum insulated glass unit frame assembly 10 comprises a vacuum insulated glass (VIG) unit 1, and a frame 20. The frame 20 comprises elongated frame profile arrangements 20a-20d which frames the vacuum insulated glass unit 1 in a frame opening 21, defining a frame opening plane P2. These elongated frame profile arrangements 20a-20d comprises substantially parallel top and bottom frame profile arrangements 20c, 20d, and substantially parallel side profile frame arrangements 20a, 20b. Two, three or all (as illustrated) of said top, bottom and/or side profile frame arrangements 20a-20d are overlapped by the edges 8a-8d) of the vacuum insulated glass unit.

The overlapped elongated frame profile arrangement may be part of a sash. This sash may be attached to and be configured to move relative (e.g. by means of a hinge arrangement) to a frame 30 configured to be attached to a building structure. The said overlapping edges of the VIG unit may overlap both the elongated frame profiles of the movable sash and the fixed frame, but in other embodiments of the present disclosure, the edges may alone overlap the sash. In further embodiments, the sash may be fixed to the fixed frame to not be moved relative to the frame, or the sash may be a part of the fixed frame. It is understood that if the sash is movable, it may be attached to the fixed frame by means of e.g. one or more hinge arrangements, and/or my means of one or more linear actuators such as electrically controlled actuators.

The frame profile arrangements 20a-20d defines a frame opening 21 plane P2 extending between the frame profile arrangements 20a-20d in the frame opening 21.

Figure 2:
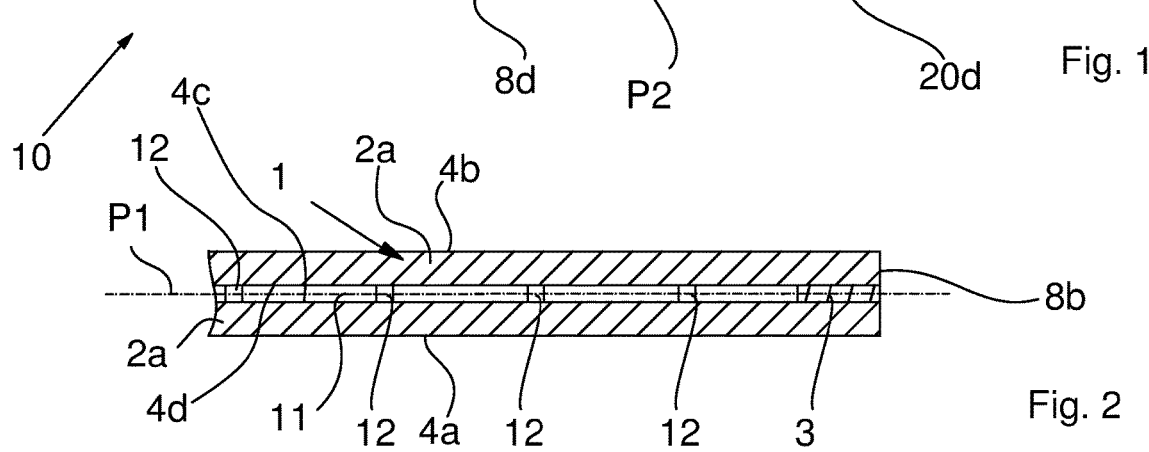

FIG. 2 illustrates schematically a cross sectional view of a rectangular VIG unit 1 to be arranged in the frame 20 according to embodiments of the present disclosure. The VIG unit 1 comprises two glass sheets 2a, 2b such as tempered glass sheets, e.g. thermally tempered glass sheets, but it may also be annealed glass sheets.

The glass sheets 2a, 2b are separated by a gap 11 between the glass sheets 2a, 2b, and a plurality of support structures 12 are distributed in the gap 11. The gap 11 may for example be 0.05-0.5 mm. The gap 11 is sealed by an edge sealing 3, such as a fused edge sealing, which may e.g. be made from a solder glass material, e.g. low melting temperature solder glass material, or a metal solder material.

The support structures 12 may be made from metal, glass or polymer and be arranged in a grid or another pattern to maintain the gap 11 between the glass sheets 2a, 2b when the gap 11 is evacuated to a pressure below e.g. $10^{-3}$ bar, such as below 10-bar, e.g. to about or below $10^{-3}$ mbar. The glass sheets 2a, 2b comprises major surfaces 4c, 4d facing the gap 11, and the support structures support on these surfaces. The glass sheets also comprises outwardly facing major surfaces 4a, 4b facing away from the gap 11. The VIG unit's thickness, measured between and perpendicular to the outwardly facing surfaces 4a, 4b of the VIG unit may in embodiments be between 4-15 mm such as between 4-12 mm, e.g. 4-10 mm.

Especially if the VIG unit glass sheets 2a, 2b are tempered glass sheets, the distance between neighbouring/adjacent support structures 12 may be above 3 cm or above 4 cm, such as between 3 cm and 6 cm in the evacuated VIG unit gap 11.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit 1 defines a VIG unit plane PI that will extend parallel to or coincide with the frame opening 21 plane P2 when the VIG unit is arranged in the frame 20. This plane PI may e.g. be determined when the VIG unit glass sheets 2a, 2b have the substantially same temperature and no substantial thermal deflection of the VIG unit occur (DT=0° C.).

Figure 3:
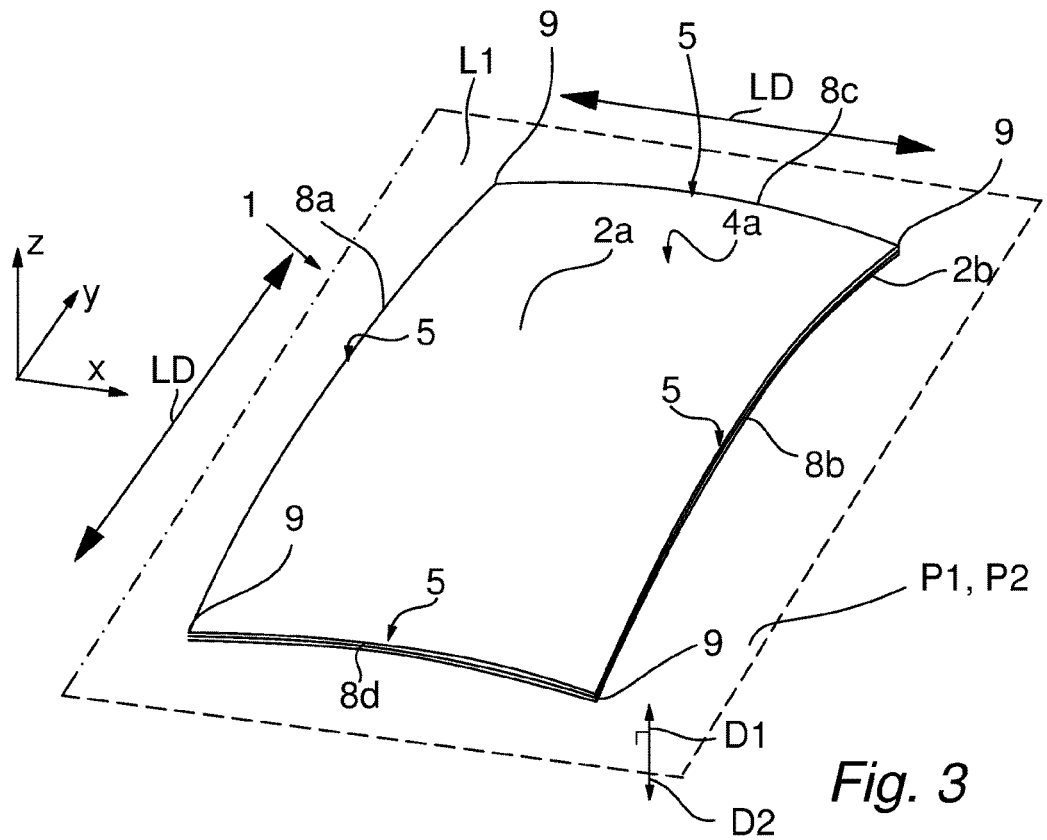
Figure 4:
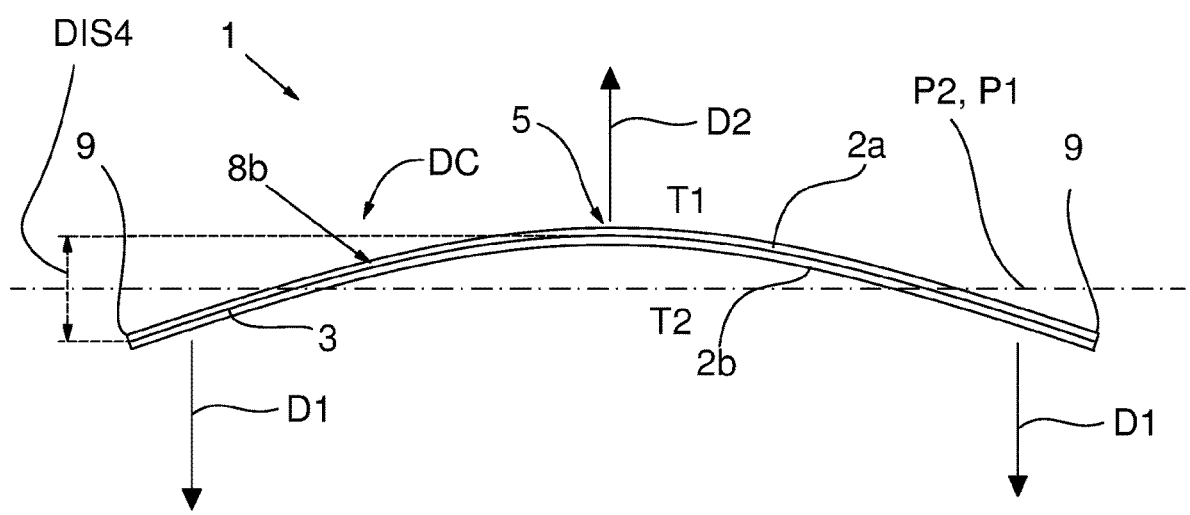

FIGS. 3 and 4 illustrates schematically a VIG unit thermal deflection as a result of a temperature difference DT=T1−T2 between the two VIG unit glass sheets 2a, 2b providing the evacuated gap, according to embodiments of the present disclosure.

In FIG. 3, the VIG unit 1 is shown schematically and in perspective, where it can be seen that the outer major surface 4a of the VIG unit 1 may thus obtain a convex shape when T1 is higher than T2 whereas the other outer surface 4b of the other (lower) glass sheet 2b (not visible in FIG. 3) provides a concave shape due to the thermal deflection. The VIG unit 1 deflects relative to the VIG unit plane PI (determined where DT is substantially zero) and relative to the frame opening plane P2, in the directions D1, D2 which are perpendicular to the planes PI and/or P2.

The planes P2 and PI extends in the x-y direction, and the thermal deflection of the VIG unit edges 8a-8d is provided in the z direction relative to the planes PI, P2.

FIG. 4 illustrates schematically and seen from the side onto the long edge 8b, the thermal deflection of the edge 8b. As can be seen, the VIG unit edge 8b may tend to describe a deflection curve DC due to thermal deflection of edge 8b, caused by a temperature difference DT=T1-T2 between the two glass sheets 2a, 2b. In the present example, the glass sheet 2a is subjected to a higher temperature T1 than the glass sheet 2b subjected to temperature T2. This cause the glass sheet 2a to expand more than glass sheet 2b. As the edge seal 3 may provide a very rigid connection between the glass sheets, this causes the VIG unit to thermally deflect, and this temperature difference may cause the edge 8b to describe a deflection curve that varies relative to the frame opening plane P2 and the VIG unit plane PI.

The edges 8a-8d of the VIG unit may also in the present disclosure be referred to as narrow edges.

As can be seen from various figures of the present disclosure, the plane PI and the frame opening plane P2 may coincide. In other embodiments of the present disclosure however, the plane PI may be parallel to the frame opening plane P2, but may not coincide with the plane.

The outer, major surface 4a of the VIG unit 1 at or near the edge, e.g. at the surface 4a opposite to the edge seal 3 may thus obtain a convex shape when T1 is higher than T2 whereas the outer surface 4b of the other (lower) glass sheet 2b provides a concave shape. As can be seen, the corners 9 of the VIG unit where the edge 8b terminates may move in a first direction D1 relative to the plane PI and/or P2, whereas the centre portion 5 of the edge 8b, is may move in the opposite direction D2 than the first direction D1, relative to the plane PI and/or P2.

When/if the glass sheet 2b gets hotter than glass sheet 2a, caused by a temperature change of T1 and/or T2, the corners 9 of the VIG unit moves in the second direction D2 relative to the plane PI and/or P2, and the centre portion 5 of the edge 8b, move in the first direction D1, relative to the plane PI and/or P2.

As can be seen, in FIG. 4, the frame opening plane P2 here is in the figure determined to be placed to coincide with the VIG unit plane PI in the frame (the frame is though not illustrated). In some embodiments, the total edge deflection DIS4 will be the sum of the largest distances of positions of the VIG unit edge in question from the frame opening plane in each their direction D1, D2 from that plane. In FIG. 4, the largest total edge deflection DIS4 is defined between the edge seal 3 at the centre 5 of the edge 8b, and the edge seal 3 at the corner 9 of the same edge, in a direction perpendicular to the plane P2, PI.

It is generally understood that when the vacuum insulated glass unit is arranged in the frame as described in relation to various embodiments below or above, the VIG unit edges 8a-8d are allowed to thermally deflect due to a temperature difference between the two glass sheets 2a, 2b enclosing the evacuated gap 3.

In embodiments of the present disclosure, the largest total edge deflection DIS4 of any of said overlapping edges 8a-8d of the vacuum insulated glass unit at a temperature difference DT=T1-T2 between the two glass sheets 2a, 2b of 65° C. as compared to the vacuum insulated glass unit (1) at a temperature difference (DT=T1-T2) of 0° C. is at least 2 mm, such as in the range of 2 to 40 mm, such as in the range of 5 to 35 mm, preferably in the range of 8 mm to 20 mm. In embodiments of the present disclosure, the largest total edge deflection DIS4 of any of said overlapping edges 8a-8d of the vacuum insulated glass unit at a temperature difference DT=T1-T2 between the two glass sheets 2a, 2b of 40° C. as compared to the vacuum insulated glass unit at a temperature difference DT=T1-T2 of 0° C. may be at least 1 mm, such as in the range of 1 to 25 mm, such as in the range of 3 to 15 mm, preferably in the range of 4 to 12 mm.

For example, in embodiments of the present disclosure, the largest total edge deflection DIS4 of any of said overlapping edges 8a-8d of the vacuum insulated glass unit 1 at a temperature difference DT=T1-T2 between the two glass sheets 2a, 2b of 65° C. as compared to the vacuum insulated glass unit at a temperature difference (DT=T1-T2) of 0° C. is at least 0.3% of the length of the deflecting edge (8a-8d), such as in the range of 0.3% to 3.5% of the length of the deflecting edge (8a-8d), such as in the range of 0.4% to 2% of the length of the deflecting edge (8a-8d), such as in the range of 0.6% to 1.5% of the length of the deflecting edge (8a-8d).

In an embodiment, the largest total edge deflection DIS1+DIS2 of any of said overlapping edges 8a-8d of the vacuum insulated glass unit at a temperature difference DT=T1-T2 between the two glass sheets 2a, 2b of 40° C. as compared to the vacuum insulated glass unit at a temperature difference (DT=T1-T2) of 0° C. is at least 0.15% of the length of the deflecting edge (8a-8d), such as in the range of 0.15% to 3% of the length of the deflecting edge (8a-8d), such as in the range of 0.25% to 1.8% of the length of the deflecting edge (8a-8d), such as in the range of 0.35% to 1.2% of the length of the deflecting edge (8a-8d).

The length of the long/longer opposing edges 8a, 8b of the vacuum insulated glass unit (1) may in embodiments of the present disclosure be in the range of 500 to 3000 millimetres, preferably in the range of 600 to 1300 millimetres. The length ratio between the shorter opposing edges 8c, 8d and the longer opposing edges 8a, 8b of the VIG unit 1 may in embodiments of the present disclosure be in the range of 0.3 to 0.9, preferably in the range of 0.35 to 0.85.

Figure 5:
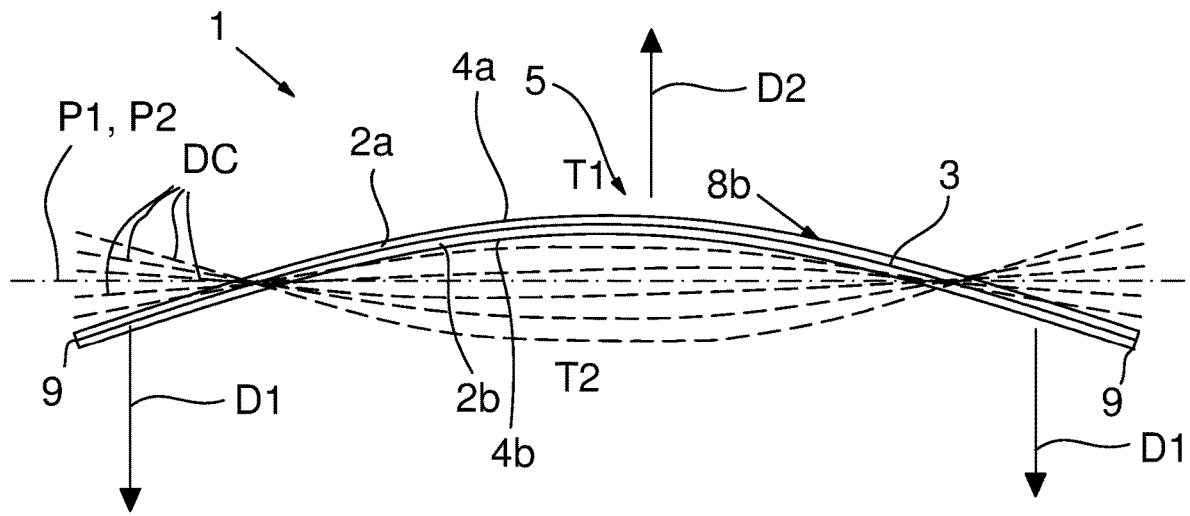

FIG. 5 illustrates an example of a situation where a VIG unit 1 is subjected to a varying temperature difference DT=T1-T2 between the glass sheets 2a, 2b over time, according to embodiments of the present disclosure.

For example, it is common for e.g. building aperture covers such as windows or doors arranged in openings of outer walls, roofs or the like of a building, that these are subjected to varying temperature differences over time after they have been installed. Similar temperature differences may also apply to refrigerator and cooler covers or doors.

For example, with a room temperature T1 of e.g. about 20° C. in the building, the temperature T2 at the other side (outside a building) of the VIG unit 1 may vary significantly, such as between e.g. 15° C. and 30° C. or even more, over 24 hours.

Even, the temperature difference DT=T1-T2 may so to say switch "operational sign" so that the hotter side of the VIG unit may shift one or more times over e.g. 24 hours, many times over a calendar year, or even in the mere case that a hail, rain or snow shower occurs for a short period of time. This may e.g. largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours. This causes the temperature difference DT to switch operational sign: The temperature T1 is 20° C. at the inside, and T2 (outside) is 10° C. at 8 PM. Thus, the VIG unit edge 8b corners 9 deflect in a first direction D1 as illustrated in FIG. 3. Then the thermal deflection of the VIG unit edge 8b gradually changes (illustrated by dashed deflection curves DC) as the temperature T2 changes to be 35° C. at 3 AM at surface 4b, and thus 15° C. higher than T1. Thus, the VIG unit thermal deflection changes so that the edges 8a-8d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection of the VIG unit 1 may vary significantly over 24 hours and even more over a longer period such as a calendar year and may depend on different weather conditions. A similar temperature difference may occur when a refrigerator or freezer door is opened or if the cooling device is turned on/off. This causes varying stress condition on the VIG unit over time, such as at the edges 8a-8d near the location where the VIG unit glass sheets are connected to seal the gap evacuated 11 by e.g. an edge sealing 3. The stress conditions are complex. Examples of these stresses may be shear stresses at the VIG edge, differential stresses where tensile stress occurs at the deflecting glasses and/or stress concentrations at the corners.

Figure 6:
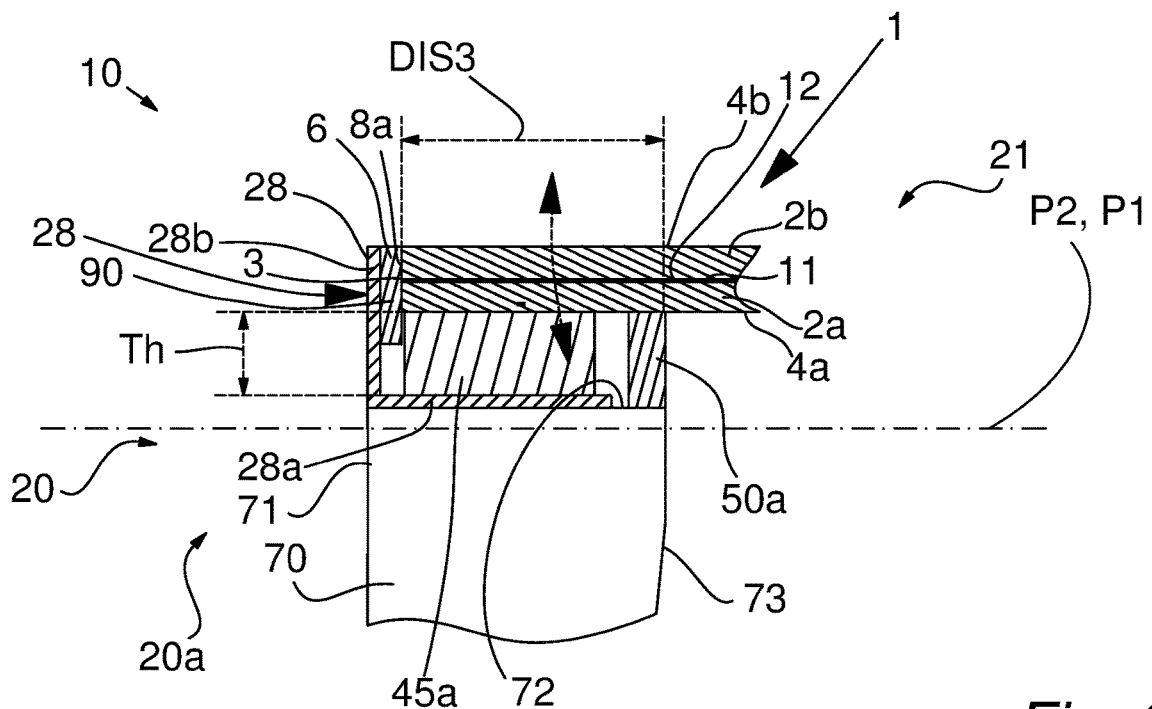

FIG. 6 illustrates a cross sectional view of a vacuum insulated glass (VIG) unit frame assembly 10 according to embodiments of the present disclosure, where an edges 8a of the rectangular VIG unit overlaps an elongated frame profile arrangement 20a of the frame. An inwardly directed, major surface 4a of a glass sheet 2a of the vacuum insulated glass unit is bonded to the overlapped elongated frame profile arrangement 20a by means of a structural adhesive 45a. In the present example, it is the outer, major surface 4a of the vacuum insulated glass unit 1 that is bonded to the elongated frame profile arrangement 20a by means of a structural adhesive. But if the VIG unit comprises further glass sheets, such as e.g. a laminated glass sheet that has a smaller size than the VIG glass sheet, it may not be bonded to the outer surface of the VIG unit. See e.g. FIG. 14.

As can be seen, the structural adhesive 45a may be bonded to the vacuum insulated glass unit along and opposite to the edge seal 3 of said vacuum insulated glass unit which seals the gap between the VIG unit glass sheets.

The width of the structural adhesive 45a may in embodiments be wider than the width of the edge seal 3, and may hence overlap to be placed opposite to the gap 11. However, in other embodiment, the width of the structural adhesive 45a may be the same or less than the width of the edge seal 3. The width of the edge seal and the width of the structural adhesive may be measured along the surface 4a that the adhesive 45a is attached to.

In further embodiments of the present disclosure, the structural adhesive may alone be arranged opposite to the gap 11, and not opposite to the edge seal 3.

The overlapping edge of the vacuum insulated glass unit is allowed to thermally deflect as described above (DIS4) relative to the elongated frame profile 20a in a deflection direction perpendicular to the frame opening plane P2 due to a temperature difference DT between the two glass sheets 2a, 2b, and the allowed thermal deflection of the overlapping edges 8a-8d is configured to have a varying magnitude along the edge 8a-8d between the corners 9 where the respective edge 8a-8d terminates as e.g. illustrated or described in relation to one or more of FIGS. 3-5.

The inwardly facing surface 4a of the vacuum insulated glass unit is fixed to a holding member 28a by means of the structural adhesive 45a, and the holding member 28a is connected to a surface 72 of the elongated frame profile arrangement 20a-20d, in the present example to a surface 72 of the sash profile 70 by means of an adhesive, one or more screws, nails or other mechanical fastening systems (not illustrated) and/or the like. a frame wall 28b is arranged opposite to the overlapping edge 8a, and a sealing material 6, such as a resilient material such as a silicone, rubber or butyl sealing is placed between the frame wall 28b and the overlapping edge 2a so as to provide a water tight seal between the frame wall 28b and the vacuum insulated glass unit edge 8a.

The frame wall 28b is in the present example part of an elongated profile 28 comprising the holding member 28a. It is generally understood that this profile 28 may be made from a plastic material such as a PVC (polyvinyl chloride) or PP (polypropylene) plastic material, it may be composite material such as a glass or carbon fibre material, the profile providing may be made from a plastic material with fibres embedded to obtain a more strong/rigid profile and/or the like. Also, in one or more embodiments, one or more of the profiles of the frame may be made from a metal such as steel or aluminium or another suitable metal alloy. The cross sectional shape of the profile 28 part providing the frame wall 28b and the connection part 28a may as illustrated be substantially L-shaped.

The frame wall 28b may in embodiments e.g. have a thickness less than 10 mm, such as less than 7 mm, e.g. less than 5 mm.

The structural adhesive 45a may e.g. on embodiments of the present disclosure be a Silane-terminated polyurethane (SPUR) adhesive, a Modified-Silyl Polymer (SMP) adhesive or a silicone adhesive.

In embodiments of the present disclosure, the structural adhesive 45a may be configured to be compressed and/or expand/be stretched due to said thermal deflection of the edge, hence allowing the thermal deflection of the edge as illustrated by the double-arrow in FIG. 6, so that the VIG unit edge 8a moves towards or away from the sash profile 70 when the previously explained temperature difference changes.

In one or more embodiments of the present disclosure, the structural adhesive 45a may have a thickness Th between 3 mm and 30 mm, such as between 4 mm and 20 mm, such as between 5 mm and 15 mm at a temperature difference (DT=T1-T2) between the two glass sheets (2a, 2b) of 0° C. This thickness is measured
> perpendicular to the surface 4a of the VIG unit to which the adhesive 45a is attached, and between this surface 4a and the surface of the frame (such as the surface of the profile 28 as in the example of FIG. 7) to which the adhesive 45a is attached.

In embodiments of the present disclosure, the structural adhesive 45a may have a thickness Th of at least 4 mm, such as at least 5 mm, such as at least 7 mm, for example at least 9 mm at a temperature difference DT=T1-T2 between the two glass sheets 2a, 2b enclosing the gap of 0° C.

In embodiments of the present disclosure, a minimum distance may be provided between the overlapped elongated frame profile arrangement 70 and the surface 4a of the vacuum insulated glass unit. This minimum distance may be at least 4 mm such at least 5 mm, for example at least 6 mm, at a temperature difference DT=T1-T2 between the two glass sheets 2a, 2b of the vacuum insulated glass unit of substantially 0° C., wherein said minimum distance is determined in a direction perpendicular to the outer major surface 4a of the vacuum insulted glass unit. The distance may be measured/defined while the VIG unit frame assembly is arranged so that the planes PI, P2 are arranged vertical and/or horizontally (and hence gravity forces the VIG towards the elongated member 70).

The sash profile 70 may e.g. be a wood material sash profile. In other embodiments, the sash profile may be made from a plastic material such as a PVC (polyvinyl chloride) or PP (polypropylene) plastic material, it may be composite material such as a glass or carbon fibre material, the sash profile 70 may be made from a plastic material with fibres embedded to obtain a more strong/rigid profile and/or the like. Also, in one or more embodiments, the sash profile 70 of the frame may be made from a metal such as aluminium or another suitable metal alloy.

The sash profile may e.g. comprise or provide a surface 73 facing and enclosing a part of the frame opening 21.

The sash profile 70 and or profile 28 may e.g. be made by means of a co manufacturing such as moulding, extrusion or pultrusion, such as co-extrusion or co-pultrusion.

In the sash profile 70 and/or the profile 28 may in embodiments of the present disclosure comprise strengthening/reinforcing members (not illustrated) embedded in the profile 70, 28.

These may have any suitable shape, extends in the longitudinal direction of the profile and helps to improve/increase the rigidity and strength of the profile.

A resilient gasket or seal member 50a is arranged between the frame opening and the structural adhesive 45a so as to provide a tightening between the frame 20 and an outer surface 4a, 35a, 15 of the vacuum insulated glass unit 1.

The sealing/gaskets 50a, may in embodiments of the present disclosure be separate and removable from the frame 20, but in other embodiments of the present disclosure (not illustrated), the sealings/gasket 50a may be co-manufactured such as co extruded or co-pultruded together with the profile 28 or sash profile 70.

The gasket/sealing 50a is resilient to be configured to follow the vacuum insulated glass unit when it is subjected to a temperature difference DT between the VIG unit glass sheets enclosing the evacuated gap, so as to provide a substantially watertight and/or airtight tightening between the frame and the outer surface 4a of the VIG unit 1. Hence, when the thermal deflection of the VIG unit edge changes due to a temperature difference change, the deflection (and/or compression dependent on gasket/seal type) of the gasket/seal 50a will change, but the gasket/seal 50a will, due to the resiliency, still provide an air and/or water tightening between the surface 4a and the frame 20 in that it will follow the surface 4a movement.

The gasket/seal 50a may in embodiments of the present disclosure be a rubber gasket, e.g. an ethylene propylene diene monomer rubber (EDPM) gasket, it may be a foam gasket, a neoprene or silicone gasket, it may be a TPE (Thermoplastic elastomers) gasket and/or the like.

Generally, it is understood that the edges 8a-8d of the VIG unit overlapping the sash profile 70 may in embodiments be arranged to provide the outermost edges of the sash, or be substantially flush to the surface of the sash profile (see e.g. surface 71 in FIG. 6) facing away from the frame opening 21.

In the present example illustrated in in FIG. 6, it is the frame wall 28b arranged opposite to one or more the VIG unit edges 8a, (see e.g. also FIG. 6, 7 or 8) that is arranged to be substantially flush to the edges of the sash profile (see e.g. edge 71 in FIG. 6) facing away from the frame opening 21. Though, the VIG unit edge 8a or a frame wall 28b may also in further embodiments of the present disclosure further overlap the sash profile 70 to a position beyond the outer surface 71 of the sash facing away from the frame opening 21.

Figure 7:
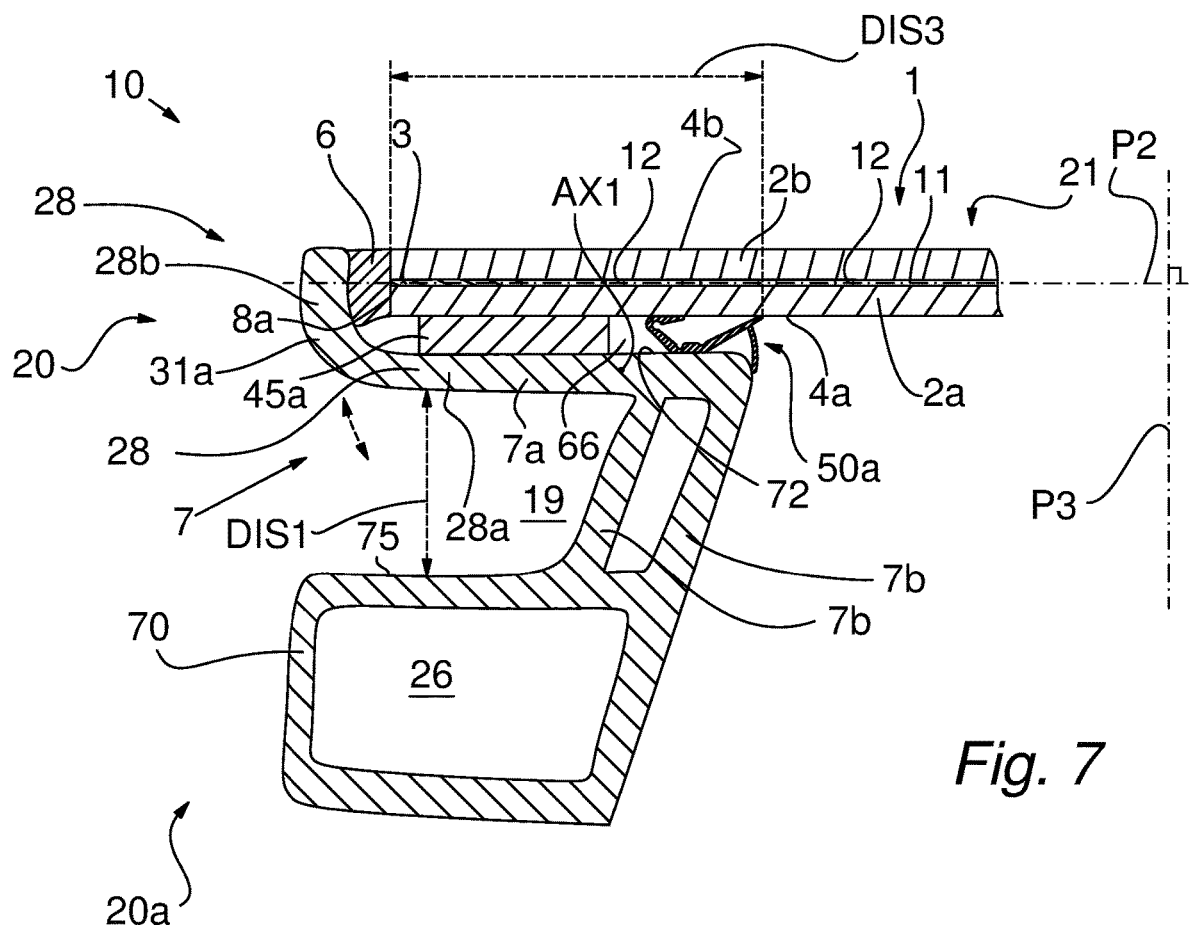

In one or more embodiments of the present disclosure, said structural adhesive may be configured to provide that the thermal deflection of the overlapping vacuum insulated glass unit edges is restricted as compared to free, un-constricted/un-restricted thermal deflection of the respective edge. This deflection may be determined at a temperature difference (DT=T1-T2) between the two glass sheets 2a, 2b of e.g. 65° C. The largest total edge deflection DIS4 may here e.g. in embodiments be restricted between 20 and 90%, such as between 40-70% compared to free, un constricted thermal deflection of the respective edge. FIG. 7 illustrates schematically a cross sectional view of an elongated frame profile arrangement 20a of a frame 20 according to embodiments of the present disclosure, comprising a flexible connection arrangement 7. The elongated frame assembly 20a comprises an elongated sash profile 70 extending in the longitudinal direction of the VIG unit 1. A holding member 28a bonds the VIG unit 1 to the frame 20 by means of the structural adhesive 45a.

The flexible connection arrangement 7 comprises a flexible wall 7a, 7b connecting the holding member 28a to the elongated frame profile arrangement 20a, in the present embodiment the elongated sash profile 70. The wall 7a of the flexible connection arrangement 7 is configured to flex when the vacuum insulated glass unit 1 exerts a bending moment on the holding member 28a due to a thermal deflection.

This bending moment may be configured to be provided about an axis AX1 having a component which is substantially parallel to the edge 8a of the VIG unit 1 extending into the recessed portion 29. Hence, the flexible portion of the wall 7a flexes so that the holding member 28a is moved relative (see dashed, curved arrow) to the elongated frame profile arrangement 70, 20a to which the individual holding member is connected.

A resilient, elongated tightening gasket or sealing 50a may in embodiments of the present disclosure extend parallel to the edge 8a between a surface 72 of the elongated member 20a and the VIG unit 1 surface 4a. This elongated tightening gasket or sealing 50a is configured to seal the space 66 between the major surface 4a of the vacuum insulated glass unit and the frame 20.

This provides a water and/or air tightening between the frame and the vacuum insulated glass unit 1. The gasket/seal 50a may be placed between a fixation arrangement 45a and the frame opening 21. In FIG. 7, the resilient gasket/seal 50a is placed between the wall(s) 7a of the flexible connection arrangement 7 and the VIG unit surface 4a, and support on the flexible connection arrangement. Hence, when the thermal deflection of the VIG unit edge changes due to a temperature difference change, the deflection (and/or compression dependent on gasket/seal type) of the gasket/seal 50a will change, but the gasket/seal 50a will, due to the resiliency, still provide an air tightening between the surface 4a and the frame 20 in that it will follow the surface 4a movement.

In FIG. 7, the gasket/seal 50a comprises deflectable flaps/lips 60a, 60b, and a space 62 defined between the flaps/lips 60a, 60b and enclosed by the VIG unit surface 4a helps to provide an air and/or heat insulation. The gasket arrangements 50a lips 60a, 60b thus follow the VIG unit edge 8a movement when the VIG unit's thermal deflection changes due to a temperature difference variation, due to the resilient properties of the gasket arrangement 50a, so as to provide an air tightening functionality.

In the example of FIG. 7, the flexible connection arrangement 7, the elongated frame/sash member 70 and the holding member is integrated in the same frame profile 28. The profile 28 may either be an extruded, moulded or pultruded, such as co extruded or co pultruded, profile. It may also be bent or roll shaped to provide a profile having this shape. It is understood that in other embodiments of the present disclosure, the profile 28 comprising the flexible connection arrangement 7, and the holding member may be integrated in one profile (e.g. by extrusion, moulding or pultrusion), and may be connected to an elongated sash profile by means of a sash connection part 28e, see FIG. 8.

The elongated sash profile 70 extending in the longitudinal direction of the VIG unit comprises an insulating cavity 26 enclosed by the sash profile wall. It is understood that the elongated sash profile may comprise a plurality of cavities extending in the longitudinal direction of the profile (substantially along/parallel to the edge 8a), and these may be separated by partition walls (not illustrated) obtained during the manufacturing of the profile. One or more these compartments/cavities 26 may in embodiments of the present disclosure be filled with an insulating arrangement (not illustrated) such as an insulating foam, a polystyrene material, a glass fibre insulation such as glass wool or mineral wool, it may comprise an aerogel insulating material and/or the like, but it/they 26 may also be kept substantially empty and thus just be filled with a gas such as air.

The profile 28 comprises distancing walls/portions 7b providing a flexing space 19 which the holding member and the wall 7a of the flexible connection arrangement 7 can deflect/move into and away from when subjected to a thermal bending. This space 19 is provided between the flexible wall 7a and the elongated sash profile 70.

The flexible connection arrangement 7 may thus suspend the vacuum insulated glass unit with a distance from the elongated frame profile arrangement's 70 to which the holding member 28a is connected.

In FIG. 7, two separated distancing walls/portions 7b providing an enclosed space there between are provided. This may e.g. help to improve rigidity of the profile in the area of the walls 7b, but it is understood that the profile 28 may also just, in other embodiments comprise just one distancing wall/portion 7b. The distancing wall or walls 7b may in further embodiments of the present disclosure also provide a flexible part of the flexible connection arrangement 7, and it is understood that in embodiments, just one distancing wall 7b may be present to e.g. help to improve softness of the flexible connection arrangement.

As can be seen in FIG. 7, the wall 7a of the flexible connection arrangement 7 may in embodiments of the present disclosure extend from the frame wall 28b and comprise a bend 31a towards a plane P3. This plane P3 extends substantially perpendicularly through the frame opening 21 plane P2 and is substantially parallel to the edge 8a arranged proximate to the structural adhesive 45a. The bend 31a provides that a part of the wall 7a extends to be arranged opposite to the outwardly facing major surface 4a of the vacuum insulated glass unit.

The thermal deflection of the edge 8a is configured to be provided relative to the frame opening plane P2 towards and away from the sash profile 70.

In embodiments of the present disclosure, the maximum distance DIS1 between the outer surface 75 of the sash profile 70 facing the flexing space 19, and the surface of the holding member 28a facing the flexing space 19 (determined substantially perpendicularly to the surface 4a and opposite to the edge seal 3) may be between 0.5 cm and 15 cm, such as between 0.5 cm and 15 cm, such as between 0.7 and 7 cm, e.g. between 1 cm and 6 cm.

In embodiments of the present disclosure, the minimum distance DIS1 between the outer surface 75 of the sash profile 70 facing the flexing space 19, and the surface of the holding member 28a facing the flexing space 19 (determined substantially perpendicularly to the surface 4a and opposite to the edge seal 3) may be at least 0.4 cm, such as at least 0.5 cm, e.g. at least 1 cm, e.g. at least 1.5 mm.

This distance DIS1 may e.g. dependent on the VIG unit size (height and/or width) and/or the layout of the flexible connection system. This distance DIS1 may in embodiments of the present disclosure apply for one or more positions, or along the entire surface 4a of the VIG unit when the temperature difference between the glass sheets 2a, 2b is substantially 0° C.

Figure 8:
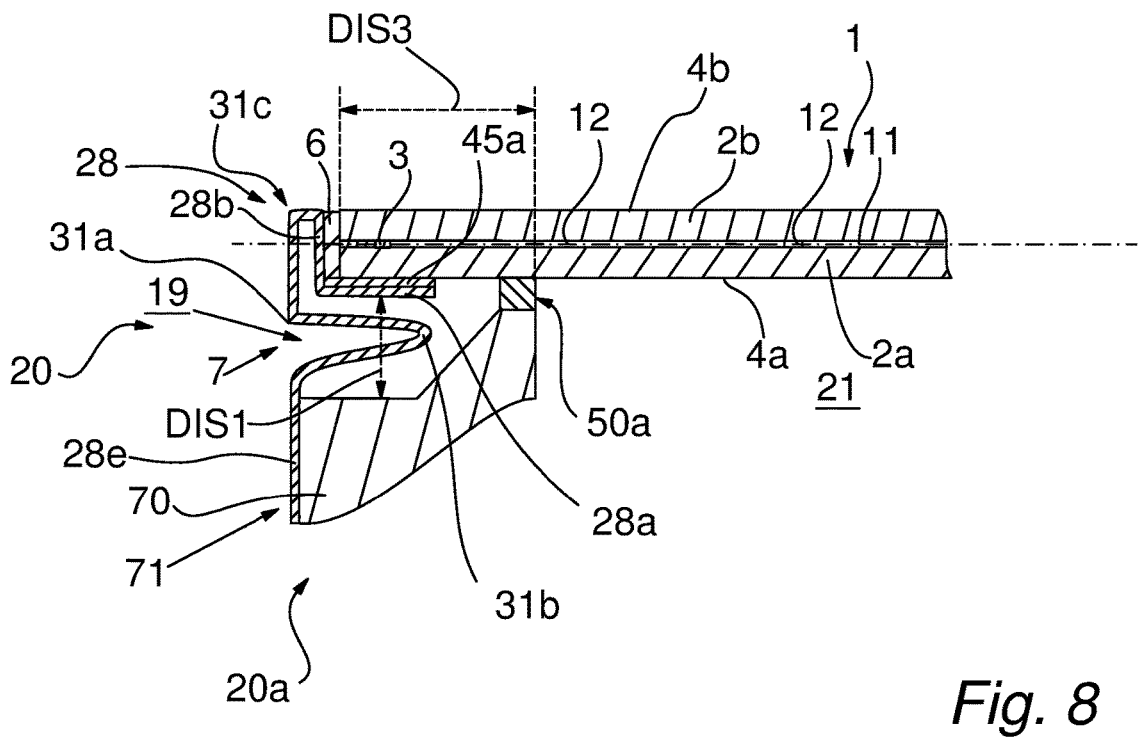

FIG. 8 illustrates schematically a cross sectional view of an elongated frame profile arrangement 20a of a frame 20 according to further embodiments of the present disclosure, comprising a flexible connection arrangement 7.

Also here, the VIG unit surface 4a is bonded to the holding member 28a by means of the structural adhesive, and the VIG unit is thus connected to the elongated profile 70 by means of the profile 28. The profile 28 comprises a sash connection wall 28e that connects the profile 28 to the sash profile 70 at a connection area 71 of the sash profile, such as a connection area different from the overlapped surface 72 facing the VIG unit. The connection wall part 28e may be connected (at connection area 71) to the sash profile 70 by means of mechanical fasteners (not illustrated) such as screws or nails, one or more snap connections, one or more tongue and groove connections and/or the like. The connection wall part 28e may also or alternatively be connected to the profile 70 by means of an adhesive.

A flexible connection arrangement 7 is placed between the sash connection part 28e to allow the VIG unit edge 8a to provide the previously explained thermal bending.

The flexible connection arrangement 7 here comprises a distancing wall 7b with a bend 31a, towards the flexing space 19 provided by the flexible connection arrangement, and towards the frame opening. Additionally, the distancing wall 7b comprises a bend 31b in a direction away from the frame opening 21. These bends provides at least a part of the flexible properties of the flexible connection arrangement 7 allowing the VIG unit edge to flex. The bends provides that a part of the wall 7b may extend into the flexing space 19.

It is generally understood that beyond the flexible connection arrangement 7 being able to flex when the thermal deflection occurs, the structural adhesive 45a may also be configured to be compressed and/or expand/be stretched due to the thermal deflection of the VIG unit edge 8a.

In FIG. 8, the profile 28 extends from the holding member 28a to which the structural adhesive is attached, into a bend so as to provide the frame wall 28b arranged opposite to the VIG edge 8a, and from here into one or more bends bend to provide the distancing wall 7b comprising the bends 3 1a, 3 1b, and from there towards the sash connection part 28e. In FIG. 8, a separation wall may extend from the sash profile 70 and towards the VIG unit 1, between the flexible connection arrangement 7 and the frame opening 21. The resilient gasket 50a is here provided between this separation wall and the proximate major outer VIG unit surface 4a.

In FIGS. 6-8 the outer, outwardly facing major surface 4b of the vacuum insulated glass unit 1 which is arranged opposite to and faces away from the overlapped, elongated frame profile arrangements 20a-20d, 70 is substantially uncovered by the frame 20. However, in other embodiments, the surface 45 may be at least partly covered by the frame (not illustrated) but preferably be overlapped less by a part of the frame 20 than the surface 4a. This may e.g. be provided at discrete fixation areas 81 as disclosed in relation to e.g. FIG. 17.

It is generally understood, that in embodiments of the present disclosure, the overlapped part 20a of the frame 20 may be overlapped by the VIG unit edge 8a area along the outer VIG surface 4a by a certain am ount/distance DIS3 (see e.g. FIGS. 6-8). This may help to provide an improved insulation performance of the VIG unit frame assembly 20, as the edge seal 3 material such as a metal material or a solder glass material, for example a low melting point solder glass, may provide a cold bridge.

The distance DIS3 may in embodiments of the present disclosure be at least two times the width of the overlapped edge seal 3, measured along an inner surface facing the gap of one of the VIG glass sheets in a direction perpendicular to the nearby edge 8a. In embodiments of the present disclosure, the distance DIS3 is between two and ten such as between three and five times the edge seal width W 1.

For example, the overlap DIS3 may in embodiments of the present disclosure be between 10 mm and 110 mm, such as between 20 mm and 80 mm, e.g. between 30 mm and 100 mm. In one or more embodiments of the present disclosure, the frame 20 may be overlapped DIS3 at least 20 mm, such as at least 50 mm, such as at least 80 mm. e.g. at least 100 mm by the VIG unit edge.

Figure 9:
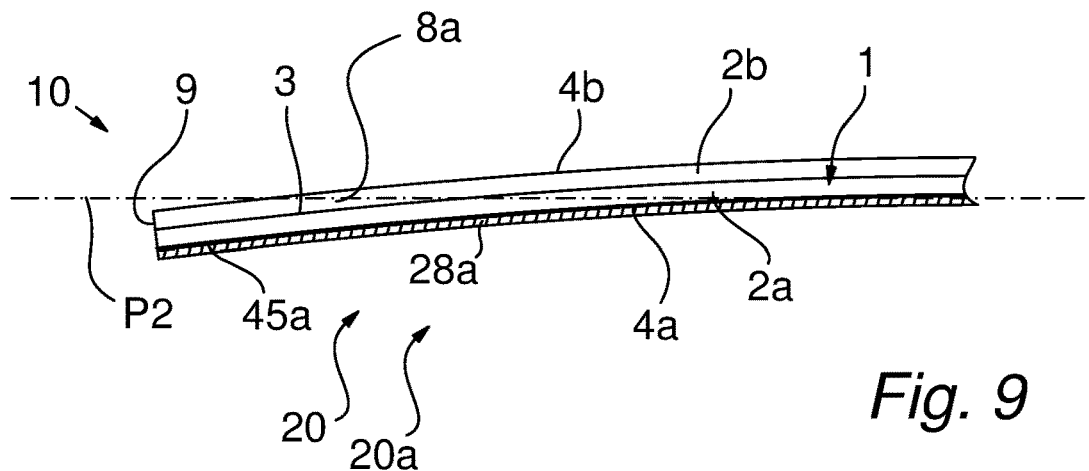

FIG. 9 illustrates schematically a cross sectional view according to embodiments of the present disclosure through the holding members 28a, and is a view towards the edge 8a of the VIG unit 1. Some parts of the frame 20, such as a sash profile 70, an optional flexible connection arrangement and the like have been omitted from the drawing to provide improved clarity of the figure. The edge 8a is subjected to thermal deflection, and hence describes a deflection curve. In this embodiment of the present disclosure, the holding member 28a of the profile 28 is configured to follow and deflect together with the thermal deflection of the VIG unit 1 edge 8a due to the bonding by means of the structural adhesive 45a. The holding member 28a is thus flexible enough to follow the deflection curve of the edge 8a. The deflection forces provided by the VIG unit 1 due to thermal deflection of the edge 8a is transferred through the structural adhesive 45a to the holding member 28a. The VIG unit 1 may here slide along and relative to the holding member 28a when the edge deflection changes. Thus, any shear forces between the holding member 28a and the surface 4a of the VIG unit to which the adhesive 45a is attached may be absorbed/obtained by the structural adhesive.

In FIG. 9, a certain compression and/or stretching of the structural adhesive 45a, 45b may be provided during the deflection of the edge and the holding member 28a, due to the thermal deflection of the VIG edge.

Figure 10:
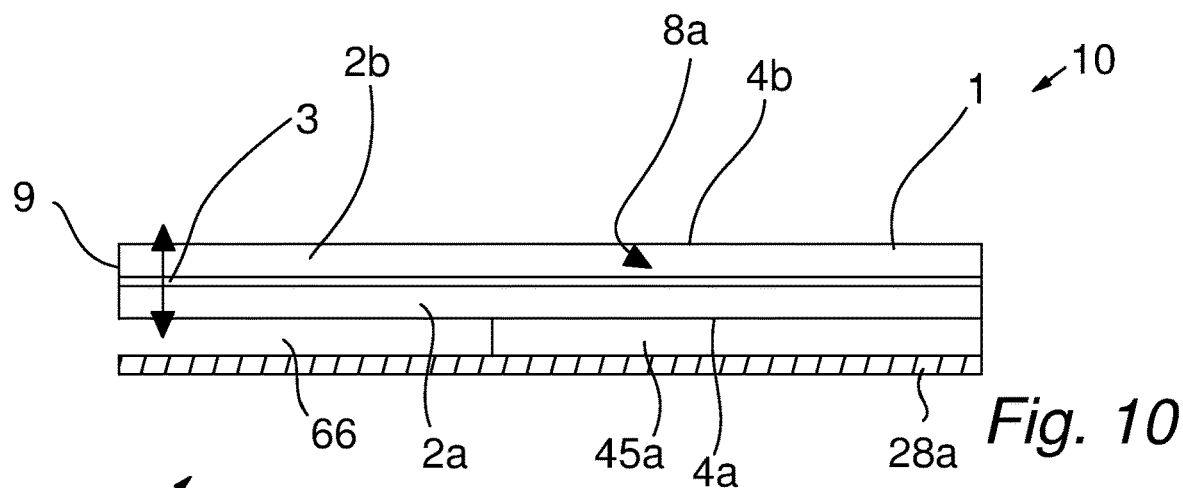
Figure 11:
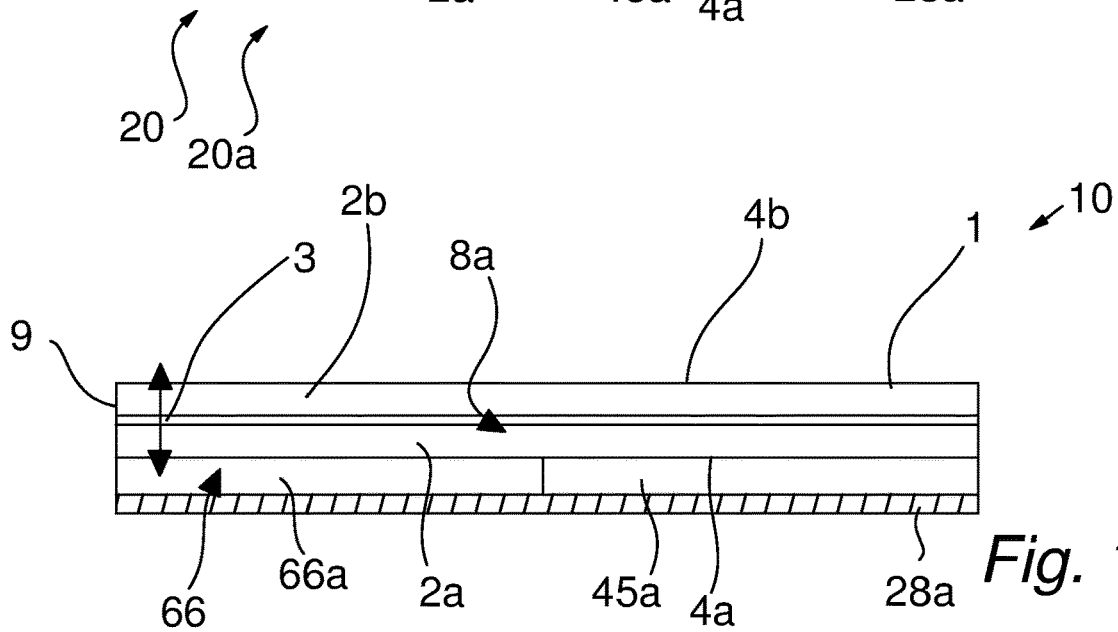

FIGS. 10-11 illustrates schematically view towards an edge 8a of the VIG unit 1 attached to the holding member 28a by means of the structural adhesive. The structural adhesive 45a is omitted at the areas of the corners 9 of the vacuum insulated glass unit, thereby providing a deflection space 66 between the holding member and the vacuum insulated glass unit 1. The corner area of the vacuum insulated glass unit will can thus deflect into this space 66 during the thermal deflection. In FIG. 10, the space 66 is kept empty/unfilled, whereas in FIG. 11, the space 66 is filled with a resilient material 66a extending between the VIG unit and the holding member. This material 66a that is softer than the structural adhesive 45a and provides a less resistance towards thermal deflection of the VIG unit than the structural adhesive 45a. This material 66a may e.g. be a foam material or a rubber material, or a gasket such as a gasket comprising a gas filled interior cavity, and may be provided to e.g. provide a water tightness function and/or to provide heat insulation.

Figure 12:
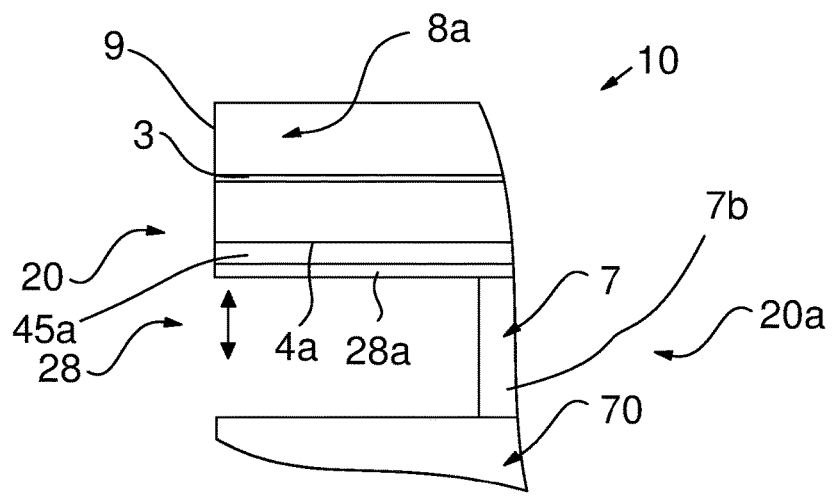

FIG. 12 illustrates an embodiment of the present disclosure, with a view towards a VIG unit edge 8a. As can be seen, the edge 8a may in embodiments of the present disclosure be exposed when the VIG unit is bonded to the frame, but in other embodiments, a frame wall as previously described and illustrated in e.g. FIG. 6 or 7 or 8 may be provided to cover the edge 8a to e.g. provide mechanical protection of the VIG unit 1 edge 8a.

FIG. 12 additionally illustrates a further embodiment of the present disclosure, where a distancing wall 7b of a flexible connection arrangement 7 is omitted at the corner area of the VIG unit 1. Hence, this may provide that the frame 20 provides a less restriction/resistance towards the thermal deflection of the VIG unit corner areas.

The structural adhesive may thus bond to the holding member 28a at the corner area, but may force the holding member 28a at the corner area to more easily deflect at the corner area due to the omitted distancing wall of the flexible connection arrangement.

Figure 13:
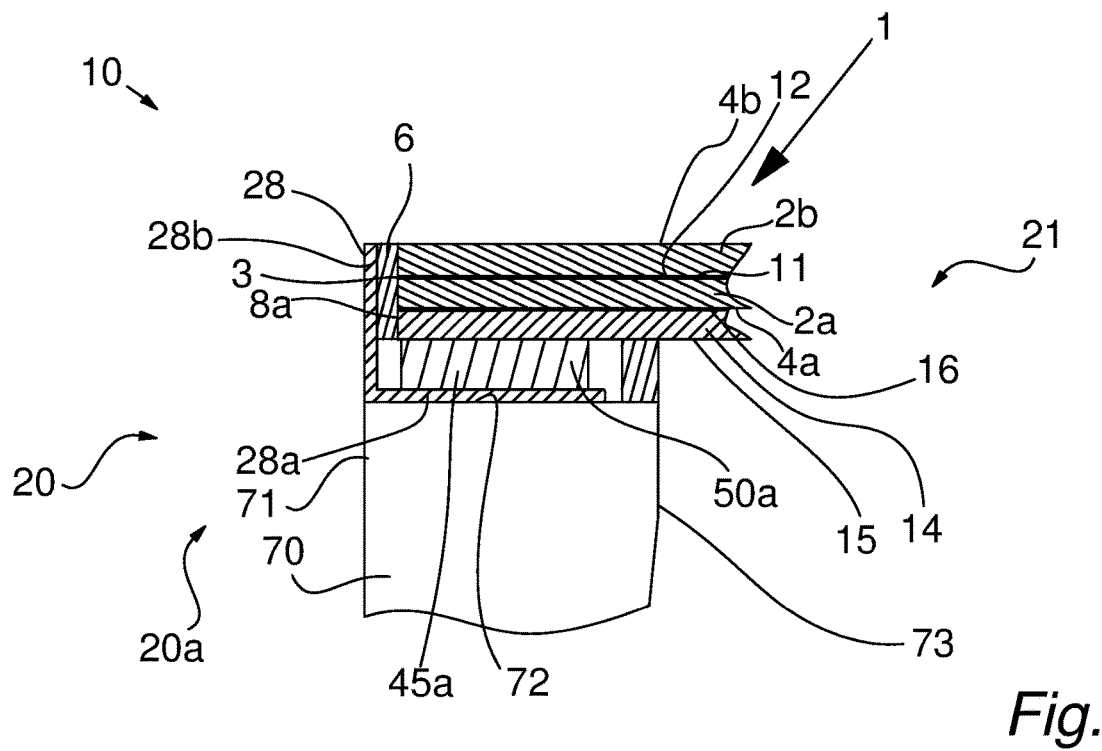

FIG. 13 illustrating schematically an embodiment of the present disclosure substantially corresponding to the embodiment of FIG. 6. However the VIG unit 1 is here a laminated VIG unit 1 with a lamination glass sheet 14, such as an annealed glass sheet or a tempered glass sheet. The lamination glass sheet 14 may e.g. have a thickness between 2 mm and 5 mm, such as between 2 mm and 4 mm, e.g. around 3 mm. This lamination glass sheet 14 is laminated to the outer major surface 4a of the VIG glass sheet 2a providing a major surface on which the support structures 12 support in the gap 11. The lamination glass sheet 14 is laminated to the VIG glass sheet 2a by means of a lamination layer 16 such as a polyvinyl butyral (PVB) or ethylene-vinyl acetate (EVA) layer. The lamination glass sheet 14 thus provides an outer major surface 15 of the glass sheet.

The structural adhesive 45a is arranged to bond to the outer surface 15 of the laminated glass sheet 14. The lamination glass sheet 14 may in embodiments of the present disclosure, be configured to face the interior of the building in case the frame assembly is a window. However, in other embodiments, it may be arranged in the frame to face the exterior of the building.

As can also be seen in FIG. 13, the gasket/seal 50a may in embodiments of the present disclosure extend between the frame and the outer surface 15 of the lamination glass sheet.

Figure 14:
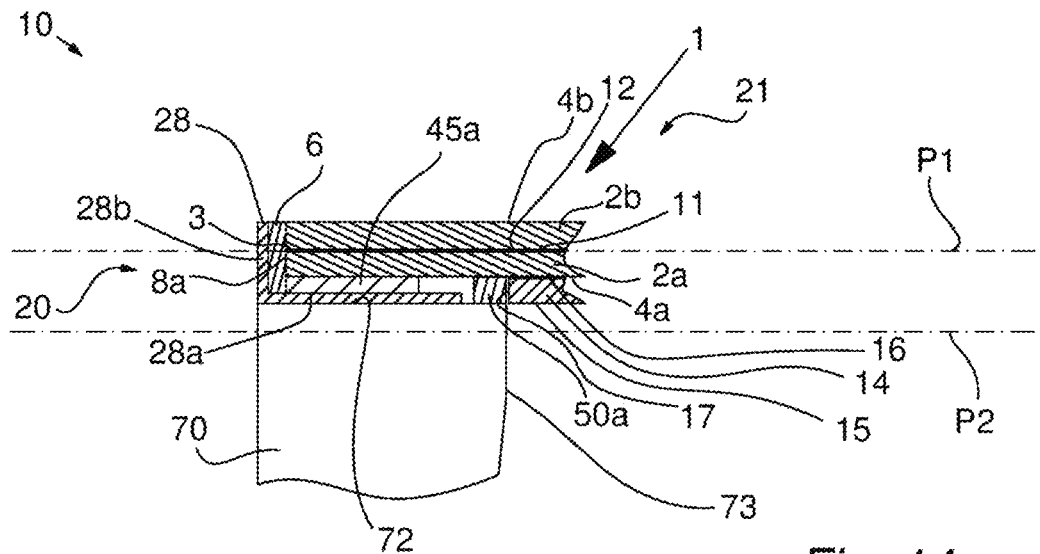

FIG. 14 illustrates schematically a cross sectional view according to an embodiment of the present disclosure, where the lamination glass sheet 14 is smaller in width and/or height than the VIG unit glass sheets 2a to which it is attached.

Figure 15:
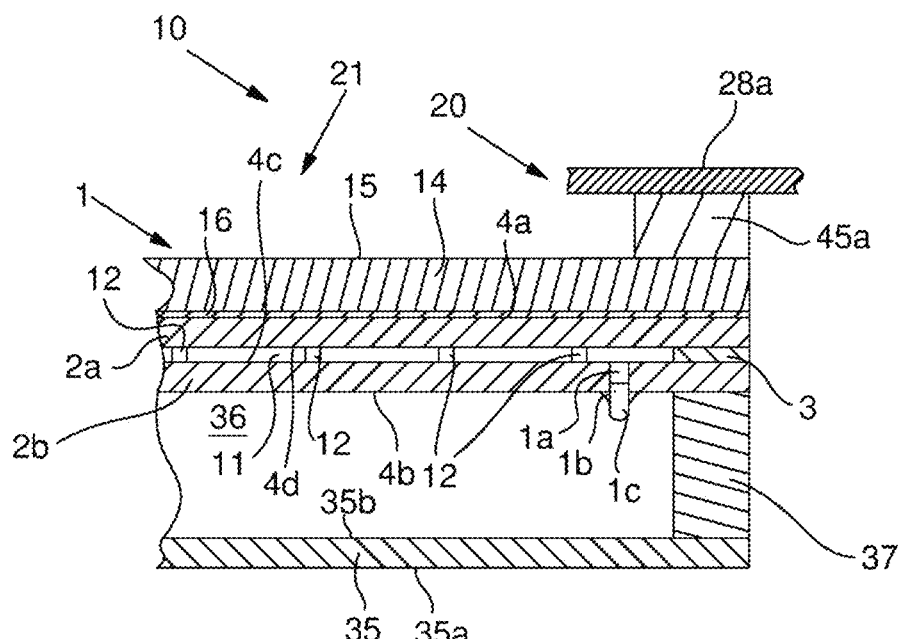

The structural adhesive 45a is thus bonded to the major surface of the glass sheet 2a enclosing the evacuated gap 11. The gasket or seal 50a is placed between the structural adhesive 45a and the edge of the lamination glass sheet facing the frame, and between the surface 72 of the sash 70 and the surface 4a of the VIG unit glass sheet 2a to which the structural adhesive 45a bonds. In other embodiments of the present disclosure (not illustrated), the smaller sized lamination glass sheet 14 may extend to overlap at least a part of the sash profile, and the gasket or seal 50a may be placed between the structural adhesive 45a and the edge of the lamination glass sheet facing the frame, and between the surface 72 of the sash 70 and the surface 15 of the lamination glass sheet 14. FIG. 15 illustrates an embodiment of the present disclosure where the VIG unit 1 is a so-to-say hybrid VIG unit comprising three glass sheets 2a, 2b, 35. This VIG unit 1 comprises glass sheets 2a, 2b paired to provide an evacuated gap 11 between surfaces 4c, 4d, and the gap 11 comprising distributed support structures between these glass sheets 2a, 2b as explained above in relation to e.g. FIG. 2. The hybrid VIG unit 1 moreover comprises a further glass sheet 35 providing a further gap 36 between the major surface 4b of the glass sheet 2b facing away from the evacuated gap 11, and this gap 36 is sealed by means of a gas-space edge seal 37. The VIG glass sheets 35, and 2b respectively thus forms a gas IG (Insulated glass) unit where a gas such as argon or any other suitable gas may be provided in the space 36 for insulating properties to slow the transfer of heat through the VIG unit.

As can be seen, an evacuation hole 1a in glass sheet 2b is sealed by a sealing system 1b, 1c in the form of a sealed evacuation port such as a tube 1c, and a sealing material 1b such as solder glass or metal solder for sealing the connection between tube 1c and glass sheet 2b. The tube 1c has been used to evacuate the gap 11. This system 1b, 1c may in embodiments of the present disclosure extend into the space 36, and is hence protected in the space.

As can be seen from FIG. 15, a lamination glass sheet 15 may in embodiments of the present disclosure be laminated 16 to the glass sheet 2a of the VIG unit in embodiments of the present disclosure, see e.g. also the above description relating to FIG. 13 or 14.

In FIG. 15, the structural adhesive 45a bonds the VIG unit 1 to an overlapped part of the frame 20 by bonding to the lamination glass sheet, but in further embodiments of the present disclosure, it may instead bond to the glass sheet 35 enclosing the gas filled gap 36. Generally, a coating, for example low-e coating (not illustrated), may in embodiments of the present disclosure be placed at one or more of surfaces 4c, 4d, 4b and/or 36b.

It is noted that even though parts of the frame 20 have been omitted from FIGS. 26 (and 27) for simplicity, a frame solution as described in relation to any of the previous figures may be used in one or more aspects of the present disclosure.

Figure 16:
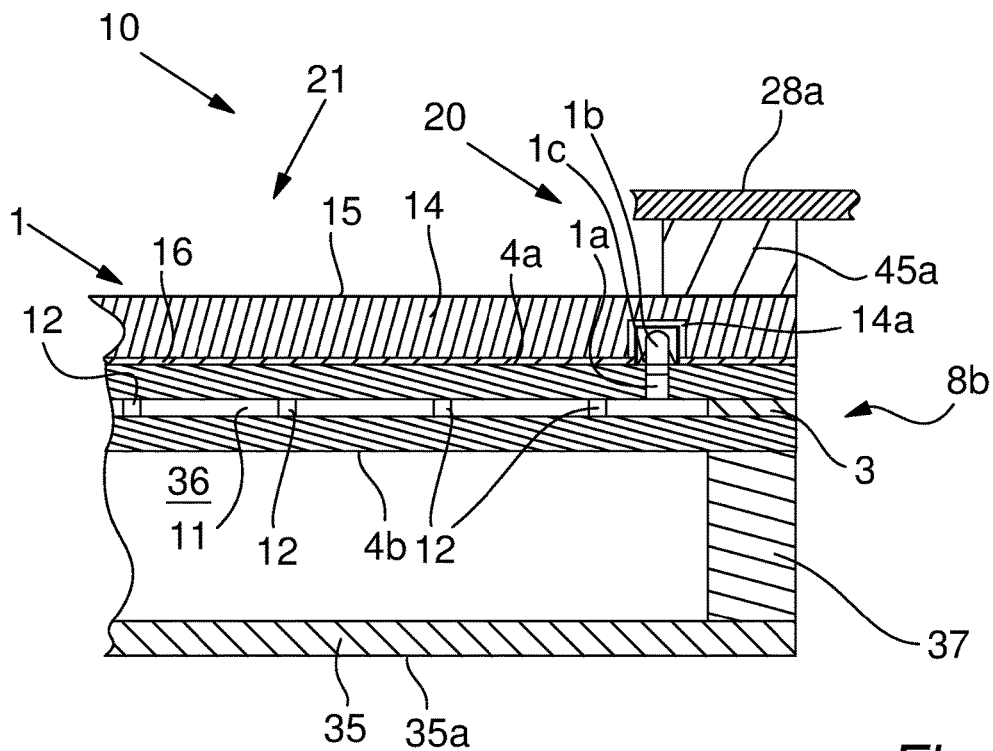

FIG. 16 illustrates an embodiment of the present disclosure where the sealing system 1b, 1c extend into a hole/recess 14a in the lamination glass sheet 14, and is hence protected by the lamination glass sheet 14. This hole in the lamination glass sheet may be a through hole or a blind hole as illustrated. This may be provided in a Hybrid VIG solution as described above and illustrated in FIG. 15 or 16, or a laminated VIG unit solution such as described previously.

FIGS. 17-19 illustrates schematically and in perspective various embodiments of the present disclosure relating to the arrangement of the structural adhesive 45a along two parallel, opposing edges, in the present examples along the long edges 8a, 8b.

FIG. 17 illustrates schematically an embodiment of the present disclosure, wherein the structural adhesive 45a is discretely arranged along the length of the longer edges 8a, 8b of the vacuum insulated glass unit 1. The discretely arranged structural adhesive 45a comprises, for each of the edges 8a-8d, two strips of structural adhesive 45a placed to adhere to the vacuum insulated glass unit at discrete fixation areas 81 distributed along the longer/long edges 8a, 8b of the VIG unit 1. These are the edges 8a, 8b that are arranged to overlap the elongated frame arrangements 20a-20d, 70 as previously disclosed (not illustrated in FIG. 17). The discrete fixation areas 81 terminate at least between 4% and 20%, such as between 8% and 15% of the length of the respective edge of the vacuum insulated glass unit from the respective corner 9 of the vacuum insulated glass unit where the edge terminates 8a. 8b. The discrete fixation areas 81 are placed so that a centre portion 5 of the vacuum insulated glass unit along the edge of edges is not bonded to the overlapped elongated frame profile arrangement 20a-20d, 70, and the centre portion 5 extends between 10% and 50%, such as between 15% and 35% of the length of the respective edge 8a, 8b of the vacuum insulated glass unit.

In is understood that in further embodiments of the present disclosure, the above mentioned solution where discrete structural adhesive is provided, may also be provided for the shorter edges 8c, 8d.

FIG. 18 illustrates schematically a further embodiment of the present disclosure, wherein the structural adhesive 45a is discretely arranged along the length of the longer edges 8a, 8b of the vacuum insulated glass unit. Here a plurality of separated strips or dots of structural adhesive 45 is applied at the surface 4a along each of the longer edges 8a, 8b, but it may also be along the shorter edges 8c, 8d (not illustrated). For example, two, four or eight or even more dots or strips of structural adhesive may be provided per length unit, such as e.g. per 30 cm or per 50 cm of the respective edge 8a. 8b along which the adhesive 45a is applied.

FIG. 19 illustrates schematically a further embodiment of the present disclosure, wherein the structural adhesive 45a is arranged substantially continuous along the length of the longer edges 8a, 8b of the vacuum insulated glass unit. The adhesive strips 45a are terminated before the corners, see e.g. also FIG. 10 or 11, but the strips 45a may also be provided along substantially the entire length of the respective VIG unit edge. In further embodiments of the present disclosure (not illustrated), one, substantially continuous strip of structural adhesive 45a may be provided along three or all four edges 8a-8d of the VIG unit 1, and bond to an elongated frame profile arrangement 20a-20d, 70 (not illustrated in FIG. 19).

The major glass sheet surface 4a, along each of two opposing longer edges 8a, 8b may in embodiments of the present disclosure be attached to said frame 20 by two strips and no more of said structural adhesive 45a distributed in the longitudinal direction LD of said longer edges 8a, 8b, such as wherein no structural adhesive 45a fixates the surface 4a along the shorter opposing edges 8c, 8d to the frame 20. Here, the length ratio between the shorter opposing edges 8c, 8d and the longer opposing edges 8a, 8b may be is in the range of 0.3 to 0.7, preferably in the range of 0.35 to 0 6

FIG. 17a illustrates schematically an embodiment of the present disclosure where holding devices 82 (only one illustrated in FIG. 17a) such as clamps assist in holding the VIG unit in the frame. The holding devices 82 is/are fixed to the frame (not illustrated) by a mechanical fixation such as a wedging solution, a plug solution and/or the like, or by means of an adhesive. The holding devices 82 may extend a bit in over the surface 4a (or 15 or 35 dependent on the VIG unit type) and also a bit in over outer 4b surface as a safety precaution at one or more edges (8a-8d) of the VIG unit. The holding devices 82 may be arranged at the discrete fixation points 81 as e.g. explained in relation to FIG. 17.

It is generally to be understood that in various embodiments of the present disclosure, one or more of the major surfaces 4a, 4b, 4c, 4d, 15 and/or 35a, 35b of the VIG unit glass sheets may be provided by one or more further layers or coatings providing advantages/features improving or providing optical properties (such as tinted/tinting effects, frosting effects, colouring effects and/or the like), mechanical protection advantages and/or advantages with regard to improving (lowering) the $U_g$-value of the VIG unit (e.g. by means of one or more low-e coatings).

FIG. 20 illustrates a visualized computer simulation of a"free" thermal deflection of a VIG unit 1 used for a frame as disclosed according to embodiments of the present disclosure, which has been provided by one of the present inventors. The VIG unit 1 simulated was based on a VIG unit model defined to have the following
characteristics: The VIG unit is laminated and hence comprises a lamination glass and a lamination interlayer
Length LI of shorter edges 8d, 8c: 114 cm
Length of the longer edges: 8a, 8b: 140 cm
Glass sheets 2a, 2b type: Thermally tempered glass sheets each having a thickness of 4 mm.
Lamination glass: annealed float glass of a thickness of 4 mm
Edge seal material: solder glass edge seal material
The VIG is arranged with the surfaces SI, S2 horizontally and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 20.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 8b would be 7.82 mm from the plane PI illustrated in the figure (DIS4). Moreover, under these conditions, the simulation results defined that the distance DIS4 from the centre part 52 of the shorter edge 8d would be 5.15 mm from the plane PI.

FIGS. 21 and 22 are images of a test of a thermal deflection of a laminated VIG unit 1 having substantially the parameters as defined above with regard to FIG. 20. The VIG unit 1 was placed horizontally to support on support surfaces 300a of a plurality of support rods 300 of a support frame 301. The VIG unit 1 supported initially, when the temperature difference ΔT=T1-T2 was substantially 0° C., on substantially all support surfaces of the frame 301 on which the VIG unit was arranged.

An infrared heat radiation arrangement 302 was arranged above the upper glass sheet, i.e. the lamination glass sheet, and covered the upper glass sheet to a bit beyond the side edge surfaces of the VIG unit 1. Then the heating arrangement 302 started to heat the upper glass sheet 14 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 9. This provided a maximum edge deflection DIS4 of the VIG unit due to the forced temperature difference ΔT=T1-T2, when compared to the temperature difference ΔT=T1-T2 of substantially 0° C. The distance DIS4 was determined by a first reference point defined by a support surface 300a (that was used as a reference for the plane PI), and the lower surface of the VIG unit 1, in a direction substantially perpendicular to the plane PI.

The maximum edge deflection DIS4 of the long edge 8b (FIG. 21) was measured to be approximately 7.4 mm, or more precisely 7.43 mm at the forced temperature difference, when compared to the temperature difference ΔT=T1-T2 of substantially 0° C. FIG. 22 illustrates the edge deflection of the shorter edge 8d of the same VIG unit as tested in FIG. 21. Here, in a similar way, the shorter edge 8d described an edge deflection curve DC due to the forced heating and the temperature difference between T1 and T2. Additionally, the maximum edge deflection DIS4 of the shorter edge 8d was measured to be approximately 5.3 mm, or more precisely 5.33 mm, at the forced temperature difference, when compared to the temperature difference ΔT=T1-T2 of substantially 0° C.

Accordingly the maximum tested edge deflection DIS4 vs the simulated edge deflection resulted in the values of table 1 below.

TABLE 1

|  | Simulated edge deflection DIS4 | Edge deflection test (FIGS. 21-22) DIS4 |
| --- | --- | --- |
| Longer edge 8b | 7.82 mm | 7.43 mm |
| Shorter edge 8d | 5.15 mm | 5.33 mm |

The inventors concluded that the test illustrated in FIGS. 21-22 validated the computer simulations, and thus confirmed that the VIG unit computer simulations was sufficiently precise and reliable.

Additionally, the test approved that the edges of larger size laminated VIG units having rigid edge seals such as provided by fused edge seal material such as solder glass or a metal solder, when subjected to a larger temperature difference, will tend to provide/describe an edge deflection curve DC (see e.g. FIG. 5) that causes a substantial edge deflection DIS4 in an un-constricted situation where no"outer" mechanical forces constrains the edge deflection. This applies both in laminated VIG units and, according to simulations, VIG units which are not laminated. It is understood that the vacuum insulated glass unit frame assembly 10 disclosed above in relation to various embodiments of the present disclosure may be used for glazing. For example a building aperture cover such as a window, e.g. a vertical window, a horizontal window or a roof window arranged at an angle between 5° and 85°, or a door. In further embodiments of the present disclosure, the vacuum insulated glass unit frame assembly may be used in or as curtain walls, gates/doors or walls of heating arrangements such as heating ovens such as house hold ovens, and/or it may be used in or as walls or gate/doors cooling appliances such as freezers or refrigerators, such as refrigerators for storing food for human consumption at a temperature below 7° C. such as below 5° C., e.g. below 0° C. or at or below −18° C.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

FIGURE REFERENCES

1: Vacuum insulated glass unit
1a: Evacuation opening in glass sheet for evacuating gap in VIG 1b: Tube such as glass tube arranged in or at evacuation opening for sealing after the evacuation
1c: Sealing system for sealing between tube and glass sheet
2a, 2b: VIG unit glass sheets enclosing evacuated gap
3: Edge seal
4a, 4b: Major, outer surfaces of VIG unit glass sheets enclosing VIG gap.
4c, 4d: Major surfaces of VIG glass sheets facing the evacuated gap 11
5: Centre portion of VIG edge
6: Sealing material placed between VIG unit edge and frame wall placed opposite to VIG unit edge
7: Flexible connection arrangement
7a: Wall member of flexible connection arrangement extending along and opposite to VIG unit surface
7b: Distancing wall of flexible connection arrangement
8a-8d: Edge of VIG unit
9: VIG unit corner
10: VIG unit frame assembly such as a window sash.
11: Evacuated gap in VIG unit defined between major surfaces of VIG glass sheets facing the evacuated gap
12: Support structure in VIG unit gap
14: VIG unit lamination glass sheet
15: Outer surface of VIG unit lamination glass sheet
16: Lamination layer.
17: Edge/surface of lamination glass sheet facing frame
19: Flexing space for wall members of flexible connection arrangement
20: Frame holding a VIG unit 20a-20d: Frame profile arrangement
21: frame opening enclosed by frame profiles.
28: elongated profile comprising holding member and optionally wall
28b and/or flexible connection arrangement 7.
28a: Holding member
28b: wall part opposite to edge
28e: Sash connection part
30: Fixed building aperture cover frame
31a: Bend of flexible connection member towards frame opening 31b: Bend of flexible connection member away from frame opening
35: Glass sheet enclosing gas filled cavity between this glass sheet and the evacuated gap in VIG unit
35a: Outwardly facing surface of glass sheet enclosing gas filled space of hybrid VIG unit
36: Gas-filled space of Hybrid VIG unit
37: Edge seal enclosing gas filled cavity
45a: Structural adhesive
50a: Resilient sealing or gasket for providing a water or airtight seal
60a, 60b: Gasket flap/lip
66: Space between holding member and VIG unit glass sheet surface
70: Sash profile
71: Connection area of sash profile
72: Surface of elongated sash profile facing VIG unit surface 81: Discrete fixation point/area
82: Fixation device such as clamp
DC: Edge deflection curve
T1, T2: Temperature of VIG unit glass sheet.
D1, D2: VIG Edge deflection direction
DIS1: Distance in flexing space
DIS3: Distance a VIG unit edge overlaps glass sheet surface
DIS4: Largest total edge deflection LD: Longitudinal direction of VIG unit edge
P2: Frame opening plane
PI: VIG unit plane
P3: Plane in frame opening perpendicular to frame opening plane

The invention claimed is:

1. A vacuum insulated glass unit frame assembly, wherein said vacuum insulated glass unit frame assembly comprises:
a rectangular vacuum insulated glass unit comprising two glass sheets separated by a gap between said glass sheets, wherein a plurality of support structures are distributed in said gap and wherein said gap is sealed, and a frame comprising elongated frame profile arrangements arranged to provide a frame opening extending in a frame opening plane defined between the elongated frame profile arrangements,
wherein a plurality of edges of said rectangular vacuum insulated glass unit overlaps an elongated frame profile arrangement of said frame, and
wherein an inwardly directed, major surface of a glass sheet of the vacuum insulated glass unit is bonded to the overlapped elongated frame profile arrangement by means of a structural adhesive, wherein said overlapping edges of the vacuum insulated glass unit are allowed to thermally deflect relative to said elongated frame profiles in a deflection direction perpendicular to said frame opening plane due to a temperature difference between the two glass sheets, and wherein said allowed thermal deflection of the overlapping edges is allowed to have a varying magnitude along the edge between the corners where the respective edge terminates, and wherein the largest total edge deflection of any of said overlapping edges of the vacuum insulated glass unit at a temperature difference between the two glass sheets of 65° C. as compared to the vacuum insulated glass unit at a temperature difference of 0° C. is at least 2 mm.

2. A vacuum insulated glass unit frame assembly according to claim 1, wherein an outer, outwardly facing major surface of the vacuum insulated glass unit which is arranged opposite to and faces away from the overlapped, elongated frame profile arrangements is substantially uncovered by the frame.

3. A vacuum insulated glass unit frame assembly according to claim 1, wherein said structural adhesive is a Silane-terminated polyurethane adhesive, a Modified-Silyl Polymer adhesive or a silicone adhesive.

4. A vacuum insulated glass unit frame assembly according to claim 1, wherein said structural adhesive extends between two parallel opposing edges of the vacuum insulated glass unit and along and substantially parallel to one or both further edge of the vacuum insulated glass unit, and wherein said structural adhesive extends along said one or both further edge for less than 90% of the length of said further edge or edges.

5. A vacuum insulated glass unit frame assembly according to claim 1, wherein said structural adhesive is discretely arranged along the length of one or more edges of the vacuum insulated glass unit.

6. A vacuum insulated glass unit frame assembly according to claim 5, wherein said discretely arranged structural adhesive for each of said edges comprises two strips of structural adhesive placed to adhere to said vacuum insulated glass unit at discrete fixation areas distributed along said edges of the vacuum insulated glass unit overlapping the elongated frame arrangements, where said discrete fixation areas terminate at least between 4% and 20% of the length of the respective edge of the vacuum insulated glass unit from the respective corner of the vacuum insulated glass unit where the edge terminates.

7. A vacuum insulated glass unit frame assembly according to claim 1, wherein said structural adhesive has a thickness between 3 mm and 30 mm at a temperature difference between the two glass sheets of 0° C.

8. A vacuum insulated glass unit frame assembly according to claim 1, wherein said structural adhesive has a thickness of at least 4 mm at a temperature difference between the two glass sheets of 0° C.

9. A vacuum insulated glass unit frame assembly according to claim 1, wherein said structural adhesive is omitted at the corner areas of the vacuum insulated glass unit, thereby providing a deflection space between a part of the frame and the vacuum insulated glass unit into which the respective corner area of the vacuum insulated glass unit will deflect during said thermal deflection.

10. A vacuum insulated glass unit frame assembly according to claim 1, wherein one or more of the elongated frame profiles of the elongated frame profiles arrangements includes a holding member, wherein said inwardly facing surface of the vacuum insulated glass unit is fixed to a holding member by means of said structural adhesive, wherein a flexible connection arrangement connects the holding member to said elongated frame profile arrangements, wherein said flexible connection arrangement is configured to flex when said vacuum insulated glass unit exerts a bending moment on the holding members, so that said holding member will move relative to the elongated frame profile arrangement to which the holding member is connected, and wherein said flexible connection arrangement comprises one or more wall members configured to provide said flexing.

11. A vacuum insulated glass unit frame assembly according to claim 1, wherein a resilient gasket or seal member, is arranged between said frame opening and said structural adhesive so as to provide a tightening between said frame and an outer surface of the vacuum insulated glass unit.

12. A vacuum insulated glass unit frame assembly according to claim 1, wherein the largest total edge deflection of any of said overlapping edges of the vacuum insulated glass unit at a temperature difference between the two glass sheets of 65° C. as compared to the vacuum insulated glass unit at a temperature difference of 0° C. is at least 0.3% of the length of the deflecting edge.

13. A vacuum insulated glass unit frame assembly according to claim 1, wherein said vacuum insulated glass unit is a laminated vacuum insulated glass unit, where a lamination glass sheet is laminated to an outer major surface of a glass sheet of the vacuum insulated glass unit by means of a lamination layer.

14. A vacuum insulated glass unit frame assembly according to claim 1, wherein said vacuum insulated glass unit frame assembly is a building aperture cover, and
wherein said overlapped elongated frame profile arrangement are part of a sash.

15. A vacuum insulated glass unit frame assembly according to claim 1, wherein the length of longer opposing edges of the vacuum insulated glass unit is in the range of 500 to 3000 millimetres.

16. A vacuum insulated glass unit frame assembly according to claim 1, wherein said overlapped elongated frame profile arrangement is overlapped at least 20 mm by said vacuum insulated glass unit edge.

17. A vacuum insulated glass unit frame assembly according to claim 1, wherein said structural adhesive is bonded to the vacuum insulated glass unit along and opposite to an edge seal of said vacuum insulated glass unit which seals the gap between the vacuum insulated glass unit glass sheets.

18. A vacuum insulated glass unit frame assembly according to claim 1, wherein a minimum distance in a space between said overlapped elongated frame profile arrangement and the surface of the vacuum insulated glass unit to which the structural adhesive bonds is at least 4 mm at a temperature difference between the two glass sheets of the vacuum insulated glass unit of substantially 0° C., wherein said minimum distance is determined in a direction perpendicular to the outer major surface of the vacuum insulted glass unit.

19. A vacuum insulated glass unit frame assembly according to claim 1, wherein the thermal transmittance ($U_g$-value) of the vacuum insulated glass unit is below 0.7 W/(m²K).

20. A vacuum insulated glass unit frame assembly according to claim 1, wherein the edges of said vacuum insulated glass unit have rigid edge seal provided by fused edge seal material.

21. A vacuum insulated glass unit frame assembly, wherein said vacuum insulated glass unit frame assembly comprises:

a rectangular vacuum insulated glass unit comprising two glass sheets separated by a gap between said glass sheets, wherein a plurality of support structures are distributed in said gap and wherein said gap is sealed, and a frame comprising elongated frame profile arrangements arranged to provide a frame opening extending in a frame opening plane defined between the elongated frame profile arrangements, wherein a plurality of edges of said rectangular vacuum insulated glass unit overlaps an elongated frame profile arrangement of said frame, and wherein an inwardly directed, major surface of a glass sheet of the vacuum insulated glass unit is bonded to the overlapped elongated frame profile arrangement by means of a structural adhesive, wherein said overlapping edges of the vacuum insulated glass unit are allowed to thermally deflect relative to said elongated frame profiles in a deflection direction perpendicular to said frame opening plane due to a temperature difference between the two glass sheets, and wherein said allowed thermal deflection of the overlapping edges is allowed to have a varying magnitude along the edge between the corners where the respective edge terminates, and wherein the largest total edge deflection of any of said overlapping edges of the vacuum insulated glass unit at a temperature difference between the two glass sheets of 65° C. as compared to the vacuum insulated glass unit at a temperature difference of 0° C. is at least 0.3% of the length of the deflecting edge.

* * * * *